(12) United States Patent
Kojima

(10) Patent No.: US 7,707,028 B2
(45) Date of Patent: Apr. 27, 2010

(54) CLUSTERING SYSTEM, CLUSTERING METHOD, CLUSTERING PROGRAM AND ATTRIBUTE ESTIMATION SYSTEM USING CLUSTERING SYSTEM

(75) Inventor: Hideki Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 977 days.

(21) Appl. No.: 11/472,311

(22) Filed: Jun. 22, 2006

(65) Prior Publication Data

US 2007/0219779 A1    Sep. 20, 2007

(30) Foreign Application Priority Data

Mar. 20, 2006   (JP) .............................. 2006-077126

(51) Int. Cl.
*G06F 17/27* (2006.01)
*G10L 11/00* (2006.01)

(52) U.S. Cl. ............................................ 704/9; 704/270
(58) Field of Classification Search ...................... None
See application file for complete search history.

(56) References Cited

U.S. PATENT DOCUMENTS

| 5,983,178 | A | 11/1999 | Naito et al. | |
|---|---|---|---|---|
| 6,484,136 | B1 * | 11/2002 | Kanevsky et al. | 704/9 |
| 6,665,644 | B1 * | 12/2003 | Kanevsky et al. | 704/275 |
| 7,020,587 | B1 * | 3/2006 | Di et al. | 703/2 |
| 7,263,486 | B1 * | 8/2007 | Hakkani-Tur et al. | 704/243 |
| 7,275,029 | B1 * | 9/2007 | Gao et al. | 704/9 |
| 7,552,051 | B2 * | 6/2009 | Privault et al. | 704/255 |
| 2005/0182626 | A1 * | 8/2005 | Kim et al. | 704/245 |

FOREIGN PATENT DOCUMENTS

| JP | 11-175090 | 7/1999 |
|---|---|---|
| JP | 2002-182682 | 6/2002 |

OTHER PUBLICATIONS

Silicia-Garcia et al., "A Dynamic Language Model Based on Individual Word Domains", Proceedings of the 18th conference on Computational linguistics, vol. 2, pp. 789-794, 2000.*

* cited by examiner

*Primary Examiner*—David R Hudspeth
*Assistant Examiner*—Brian L Albertalli
(74) *Attorney, Agent, or Firm*—Kratz, Quintos & Hanson, LLP

(57) ABSTRACT

A clustering system that clusters a language model group includes a union language model preparation unit that prepares a union language model for each language model so as to include a union of vocabularies in the language model group as entries, and a clustering unit that performs clustering with respect to the union language model group so as to classify the union language model group into a plurality of clusters. When the union language model preparation unit prepares a union language model for a certain language model, the union language model preparation unit records, regarding vocabularies included in the certain language model as a basis, occurrence frequencies of the corresponding entries in the certain language model, and records, regarding vocabularies not included in the certain language model, data showing that an occurrence frequency is 0. Thereby, a clustering system capable of clustering language models that includes voice uttered by or text written by a plurality of speakers can be provided.

10 Claims, 24 Drawing Sheets

| Attribute of cluster | Language model |
|---|---|
| 5 to 7-year-old | 5-year-old, 6-year-old, 7-year-old |
| ... | ... |
| 22 to 24-year-old | 22-year-old, 23-year-old, 24-year-old |
| ... | ... |
| 76-year-old or older | 76-year-old, 77-year-old, 78-year-old |
FIG. 11A
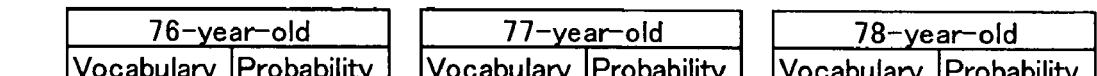
FIG. 11B

| 22-year-old audio model | | | |
|---|---|---|---|
| Audio | | | Value |
| A | Average | 1st dimension | 3.2 |
| A | Average | 2nd dimension | -8.2 |
| | ... | | |
| A | Average | n-th dimension | 0.5 |
| A | Dispersion | 1st dimension | 8.1 |
| | ... | | |
| A | Dispersion | n-th dimension | 0.2 |
| I | Average | 1st dimension | -0.8 |
| | ... | | |

71

| 22-year-old language model | |
|---|---|
| Vocabulary | Probability |
| pee | 0 |
| I | 0.3 |
| have to | 0.5 |
| go to | 0.1 |
| bathroom | 0.1 |
| nature | 0 |
| calls | 0 |

52e

| 22-year-old linking model | | | |
|---|---|---|---|
| Audio or vocabulary | | | Value |
| A | Average | 1st dimension | 0.32 |
| A | Average | 2nd dimension | -0.82 |
| | ... | | |
| A | Average | n-th dimension | 0.05 |
| A | Dispersion | 1st dimension | 0.81 |
| | ... | | |
| A | Dispersion | n-th dimension | 0.02 |
| I | Average | 1st dimension | -0.08 |
| | ... | | |
| | | pee | 0 |
| | | I | 0.3 |
| | | have to | 0.5 |
| | | go to | 0.1 |
| | | bathroom | 0.1 |
| | | nature | 0 |
| | | calls | 0 |

| 9 to 12 year-old linking model | | | 83 |
|---|---|---|---|
| Audio or vocabulary | | | Value |
| ... | | | ... |
| A | Average | 1st dimension | 0.21 |
| A | Average | 2nd dimension | -0.8 |
| ... | | | ... |
| A | Average | n-th dimension | -0.32 |
| A | Dispersion | 1st dimension | 0.04 |
| ... | | | ... |
| A | Dispersion | n-th dimension | 0.09 |
| I | Average | 1st dimension | -0.35 |
| ... | | | ... |
| | | pee | 0.05 |
| | | I | 0.3 |
| | | have to | 0.2 |
| | | go to | 0.2 |
| | | bathroom | 0.2 |
| | | nature | 0.02 |
| | | calls | 0.03 |

Rows 83a: from "A Average 1st dimension" through "I Average 1st dimension"
Rows 83b: from "pee" through "calls"

| 9 to 12 year-old audio model | | | 91 |
|---|---|---|---|
| Audio | | | Value |
| A | Average | 1st dimension | 2.1 |
| A | Average | 2nd dimension | -8 |
| ... | | | |
| A | Average | n-th dimension | -3.2 |
| A | Dispersion | 1st dimension | 0.4 |
| ... | | | |
| A | Dispersion | n-th dimension | 0.9 |
| I | Average | 1st dimension | 3.5 |
| ... | | | |

| 9 to 12 year-old language model | | 101 |
|---|---|---|
| Vocabulary | Probability | |
| pee | 0.05 | |
| I | 0.3 | |
| have to | 0.2 | |
| go to | 0.2 | |
| bathroom | 0.2 | |
| nature | 0.02 | |
| calls | 0.03 | |

FIG. 15

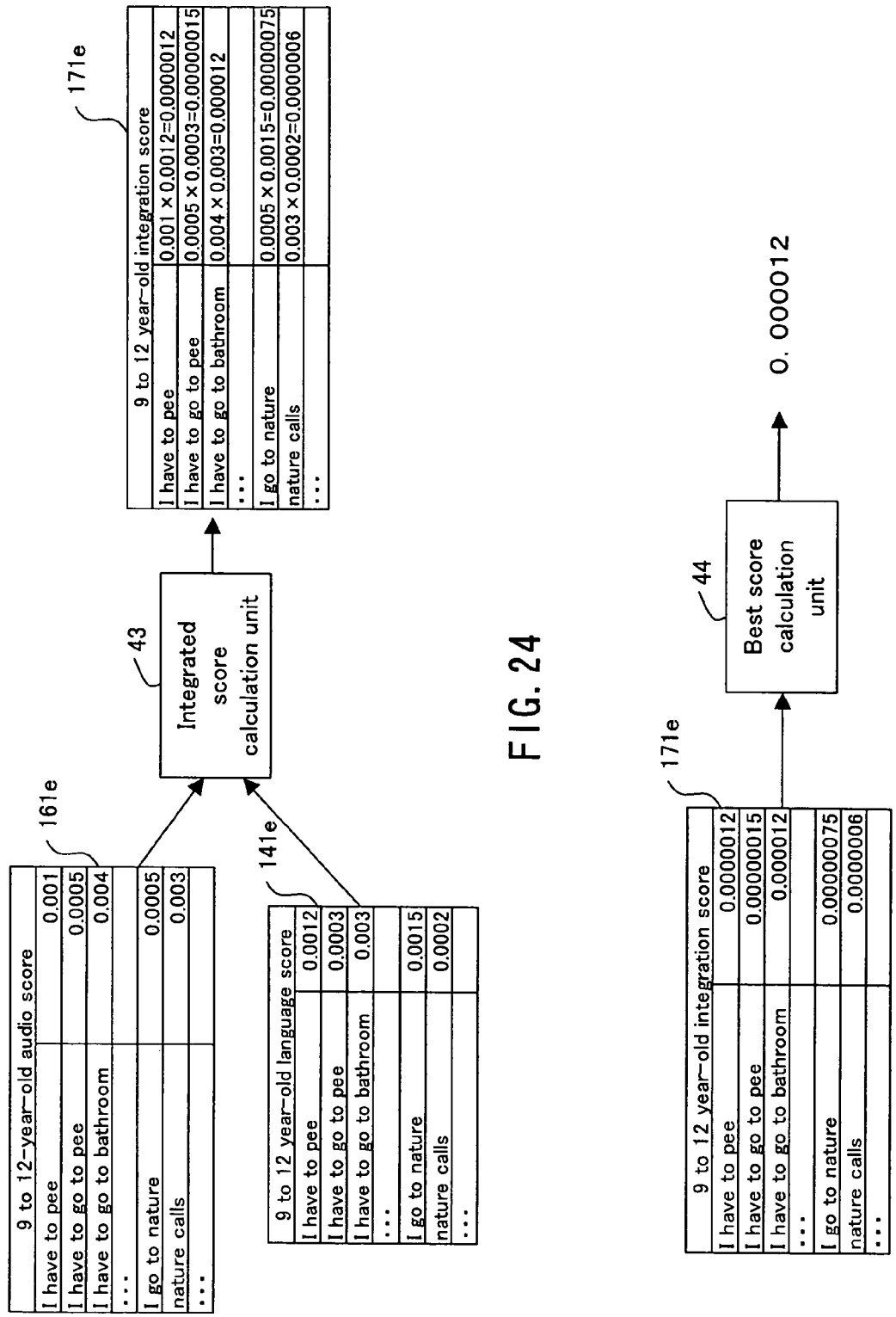

US 7,707,028 B2

CLUSTERING SYSTEM, CLUSTERING METHOD, CLUSTERING PROGRAM AND ATTRIBUTE ESTIMATION SYSTEM USING CLUSTERING SYSTEM

BACKGROUND OF THE INVENTION

1. Field of the Invention

The present invention relates to a clustering system that performs clustering of a language model, a clustering method, a clustering program and an attribute estimation system using a clustering system.

2. Description of Related Art

Conventionally, a system performing attribute estimation and speech recognition using an audio model is known. FIG. 26 shows the flow of data in a conventional attribute estimation apparatus. An attribute estimation apparatus 901 of FIG. 26 is intended to estimate the attributes of speakers, such as age groups. When receiving an input speech uttered by a speaker, the attribute estimation apparatus 901 estimates an age group of the speaker using an audio model concerning a plurality of age groups recorded beforehand, and outputs the estimation result. In the example of FIG. 26, an audio model is prepared, in which audios included in voice uttered by the respective age classes of ages 0 to 10, 11 to 20, . . . 61 to 70 and 70 or older are collected. Conventionally, an audio model is prepared using such age classes determined by a human.

In the age classes set by a human, it is difficult to incorporate the ages at which one's voice changes, the ages at which the voice of an adult changes into elderly hoarse voice, the ages at which use of words is changed from the young to adult, the ages at which use of words is changed from adult to the elderly and the like into the age classes of the audio model. In this way, the attribute classes of an audio model set by a human as he/she sees fit will inhibit the improvement in performance of an attribute estimation apparatus.

In order to understand the attribute classes accurately, it is preferable to cluster a model composed of a large amount of speaker's data. Conventionally, technology for clustering audio models composed of a large amount of speaker's data has been developed. For instance, a clustering apparatus is proposed, in which feature quantities of vocal-tract configurations of a plurality of speakers are estimated from speech-waveform data of the respective speakers, and the speakers are clustered based on these feature quantities (e.g., see JP H11(1999)-175090A). Another method is proposed, in which based on information about a vocal-tract length obtained from speech data of a speaker and information for correcting influences of his/her way of vocalization and habits, a feature quantity of the speaker is extracted, and the speaker is clustered using this feature quantity (e.g., see JP 2002-182682A). As a result of such clustering, the classes of the attributes of an audio model can be set accurately, and the clustered audio models can be obtained.

FIG. 27 shows the flow of data in a conventional attribute estimation apparatus that performs attribute estimation using a language model and audio models subjected to clustering. The audio model group is clustered according to ages of speakers, where audio model 1, audio model 2 . . . audio model n are audio models recorded according to their clusters. When receiving an input of voice uttered by a speaker, an attribute estimation apparatus 902 estimates an age group of the speaker using the audio model group subjected to clustering into a plurality of age groups and the language model, and outputs the estimation result. The attribute estimation apparatus 902 of FIG. 27 uses the audio models subjected to clustering into clusters according to age groups, but uses a language model common to all of the age groups.

Therefore, the attribute estimation apparatus 902 can recognize a difference in voice between different age groups, but cannot recognize a difference in wording between different age groups. As one specific example of Japanese, a youth may speak, "Boku-wa-genki-desu", whereas an old person may speak in a different way as in, "Washi-wa-genki-jya".

As one specific example of English, an old person may use the wording of "Nature calls", whereas a youth does not use such a wording, but uses "I have to go to bathroom".

In order to enable the attribute estimation with consideration given to such language information, it is necessary to cluster language models in which vocabularies appearing in voice uttered by or text written by a plurality of speakers are collected.

In this regard, although a method for clustering speakers based on speech data has been developed already, a method for clustering speakers based on a language model has not been established. In other words, a method for clustering language models has not been developed. The difficulty in clustering of a language model results from the fact that different language models contain different vocabularies, and therefore when a plurality of different language models are to be clustered, they cannot be processed simply as the same vector.

As a simple example, Japanese has a plurality of words representing the first person such as "boku", "washi", "watashi", "ore" and the like. Among these plurality of words representing the first person, the frequency in use is different between age groups and genders. In general, a 70-year-old man uses often "washi" as the first person, whereas a 20-year-old man uses often "boku" as the first person. Therefore, a language model for 70-year-old men will contain the word of "washi", but a language model for 20-year-old men will contain the word of "boku" instead of "washi".

As a simple example of English, a language model for 70-year-old men may contain the wording, "Nature calls", whereas a language model for 20-year-old men may contain, "to bathroom", instead of "Nature calls".

Therefore, with the foregoing in mind, it is an object of the present invention to provide a clustering system capable of clustering language models in which vocabularies appearing in voice uttered by or text written by a plurality of speakers are collected, a clustering method and a clustering program.

SUMMARY OF THE INVENTION

A clustering system of the present invention is for clustering a language model group including language models that correspond to a plurality of attribute values, each language model being associated with an attribute value showing a predetermined attribute of humans and having a plurality of entries including vocabularies appearing as speech uttered by or text written by one or more humans having attributes represented with the attribute values and data representing occurrence frequencies of the vocabularies. The clustering system includes: a union language model preparation unit that generates union data representing a union of vocabularies included in the language model group and prepares a union language model including the union of the vocabularies and occurrence frequencies of the vocabularies using the union data, the union language model being prepared for each language model included in the language model group, so as to prepare a union language model group; and a clustering unit that performs clustering with respect to the union language model group based on a predetermined method, so as to classify the union language model group into a plurality of clusters and generates cluster data representing one or more of the union language models included in each cluster. When the union language model preparation unit prepares a union language model for a certain language model, the union language model preparation unit records vocabularies included in the certain language model among the vocabularies included in the union data associated with occurrence frequencies of the vocabularies in the certain language model as entries in the union language model, and records vocabularies not included in the certain language model among the vocabularies included in the union data associated with data showing that an occurrence frequency is 0 as entries in the union language model.

In this way, when the union language model preparation unit prepares a union language model for a certain language model, the union language model preparation unit associates vocabularies included in the certain language model among the vocabularies included in the union data with occurrence frequencies of the vocabularies in the certain language model and records the associated result as entries in the union language model. Further, the union language model preparation unit associates vocabularies not included in the certain language model among the vocabularies included in the union data with data showing that an occurrence frequency is 0 and records the associated result as entries in the union language model. Thereby, the number of entries included in the union language model equals the number in the union. Therefore, all of the union language models included in the union language model group prepared corresponding to the language models have the same number of entries. That is, the union language model preparation unit can prepare a plurality of union language models having the same number of entries for the respective language models.

Thereby, the clustering unit can perform a clustering process with respect to the plurality of union language models having the same number of entries. As a result, the clustering unit can perform a clustering process of the plurality of union language models as the same vector. Since a union language model is prepared for each language model, the clustering process of the plurality of union language models means the clustering of a plurality of corresponding language models. Thereby, even when a plurality of language models included in the language model group have different number of entries, such a language model group can be clustered. As a result, a plurality of language models can be clustered.

These and other advantages of the present invention will become apparent to those skilled in the art upon reading and understanding the following detailed description with reference to the accompanying figures.

BRIEF DESCRIPTION OF THE DRAWINGS

FIG. 11A shows an example of cluster data, and FIG. 11B shows an example of a yet-to-be clustered language model group.

FIG. 14 shows a specific example of a yet-to-be clustered audio model, a union language model and a linking model.

FIG. 15 shows a specific example of a clustered linking model, and a clustered audio model and a clustered language model.

FIG. 24 shows an example of input/output data with respect to an integrated score calculation unit.

FIG. 25 shows an example of input/output data with respect to a best score calculation unit.

DETAILED DESCRIPTION OF THE INVENTION

Figure 1:
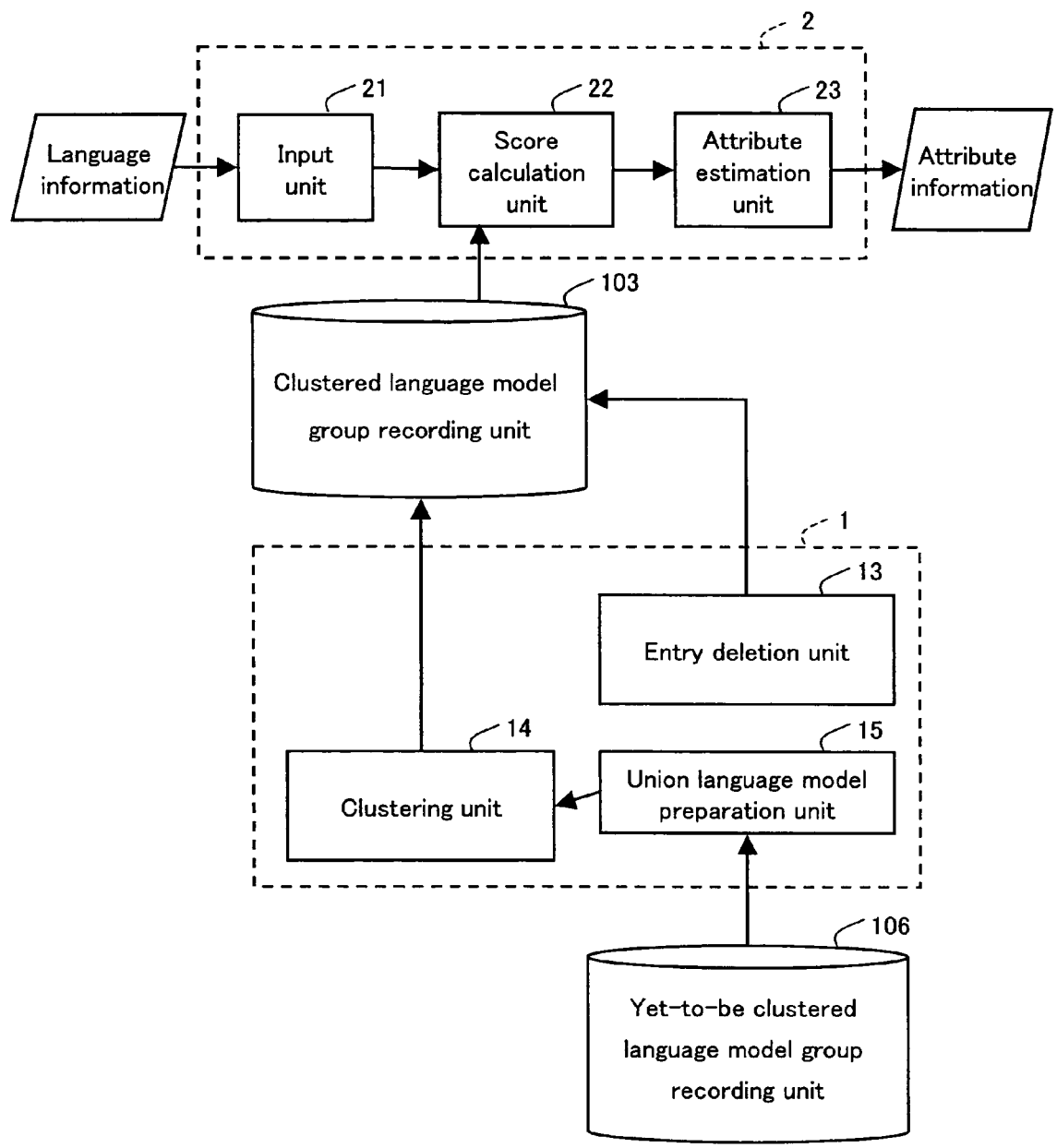
FIG. 1 is a functional block diagram showing the configuration of a clustering system and an attribute estimation system according to Embodiment 1.

In the clustering system according to the present invention, preferably, the clustering unit further generates a clustered language model corresponding to each cluster represented with the cluster data, based on a union language model included in the each cluster.

Since the clustering unit generates a clustered language model corresponding to each cluster, a typical language model of each cluster can be generated as the clustered language model.

Preferably, the clustering system according to the present invention further includes an entry deletion unit that, among entries included in the union language models or the clustered language models, deletes entries having occurrence frequencies less than a predetermined threshold value.

The entry deletion unit can delete entries with low occurrence frequencies, which are not worth while registering. Thereby, the entry deletion unit can reduce the number of entries in the union language models or the clustered language models to reduce the data size.

Preferably, the clustering system according to the present invention further includes an entry deletion unit that, among entries included in the union language models or the clustered language models, keeps N pieces of higher-rank entries in decreasing order of occurrence frequencies and deletes remaining entries.

With this configuration, the entry deletion unit can delete entries with low occurrence frequencies. That is, the number of entries can be controlled within a fixed number (N). As a result, the entry deletion unit can reduce the number of entries in the union language models or the clustered language models to reduce the data size.

Preferably, the clustering system according to the present invention further includes a linking recording unit that records audio models associated with the union language models having the corresponding attribute values as linking models for the respective attribute values, the audio models corresponding to a plurality of attribute values, each audio model being associated with an attribute value showing a predetermined attribute of humans and having a plurality of entries including audios included in speech of humans having attributes represented with the attribute values and data representing occurrence frequencies of the audios. The clustering unit performs clustering with respect to the linking models having respective attribute values recorded by the linking recording unit so as to classify the linking models into a plurality of clusters, and generates cluster data representing each cluster.

Since the linking recording unit associates an audio model with an attribute value and a union language model with the attribute value and records the same, the linking model with the attribute value includes the audio model and the union language model for the attribute value. A plurality of such linking models are recorded in accordance with their attribute values. The clustering unit clusters such a plurality of linking models, and therefore clustering can be conducted with consideration given to both of language and voice. As a result, clustering with a higher degree of precision is enabled.

Preferably, the clustering system according to the present invention further includes a weighting unit that multiplies at least one of data representing occurrence frequencies included in the entries of the audio models and data representing occurrence frequencies included in the entries of the union language models by a weighting factor so as to adjust at least one of a dispersion of the occurrence frequencies in the audio models and a dispersion of the occurrence frequencies in the union language models.

Even when a dispersion of the occurrence frequencies in the audio models and a dispersion of the occurrence frequencies in the union language models are different from each other, the above-stated weighting unit can adjust both of the dispersions.

An attribute estimation system according to the present invention is for estimating an attribute of a human using cluster data and union language models generated and prepared by the clustering system according to the present invention. The attribute estimation system includes: an input unit by which language information on the human is input; a score calculation unit that calculates a score of the language information input by the input unit using the union language models, the score being calculated for each cluster represented by the cluster data; and an attribute estimation unit that generates data showing an attribute of the human based on the scores for the respective clusters, so as to estimate the attribute.

The score calculation unit calculates scores of the input vocabularies for each cluster obtained by clustering language models in accordance with attribute values, and the attribute estimation unit estimates attributes based on these scores. Therefore, features of the respective attributes can be identified with a high degree of precision with consideration given to language information.

An attribute estimation system of the present invention is for estimating an attribute of a human using cluster data and union language models generated and prepared by the clustering system according to the present invention. The attribute estimation system includes: an input unit by which data representing speech of the human is input; a language score calculation unit that calculates a language score of the speech input by the input unit using the union language models, the language score being calculated for each cluster represented by the cluster data; an audio score calculation unit that calculates an audio score of the speech input by the input unit, the audio score being calculated for each cluster represented by the cluster data; and an attribute estimation unit that generates data showing an attribute of the human based on the audio scores for the respective clusters and the language scores for the respective clusters, so as to estimate the attribute.

A clustering method of the present invention is for clustering a language model group using a computer. The language model group includes language models that correspond to a plurality of attribute values, each language model being associated with an attribute value showing a predetermined attribute of humans and having a plurality of entries including vocabularies appearing as speech uttered by or text written by one or more humans having attributes represented with the attribute values and data representing occurrence frequencies of the vocabularies. The method includes the steps of: a union preparation step in which a union language model preparation unit provided in the computer generates union data representing a union of vocabularies included in the language model group and prepares a union language model including the union of the vocabularies and occurrence frequencies of the vocabularies using the union data, the union language model being prepared for each language model included in the language model group, so as to prepare a union language model group; and a cluster data generation step in which a clustering unit provided in the computer performs clustering with respect to the union language model group based on a predetermined method, so as to classify the union language model group into a plurality of clusters and generates cluster data representing one or more of the union language models included in each cluster. In the union preparation step, when the union language model preparation unit prepares a union language model for a certain language model, the union language model preparation unit records vocabularies included in the certain language model among the vocabularies included in the union data associated with occurrence frequencies of the vocabularies in the certain language model as entries in the union language model, and records vocabularies not included in the certain language model among the vocabularies included in the union data associated with data showing that an occurrence frequency is 0 as entries in the union language model.

A clustering program stored in a recording medium according to the present invention is for making a computer execute a clustering process of a language model group including language models that correspond to a plurality of attribute values, each language model being associated with an attribute value showing a predetermined attribute of humans and having a plurality of entries including vocabularies appearing as speech uttered by or text written by one or more humans having attributes represented with the attribute values and data representing occurrence frequencies of the vocabularies. The program makes the computer execute the following processes of: a union language model preparation process of generating union data representing a union of vocabularies included in the language model group and preparing a union language model including the union of the vocabularies and occurrence frequencies of the vocabularies using the union data, the union language model being prepared for each language model included in the language model group, so as to prepare a union language model group; and a clustering process of performing clustering with respect to the union language model group based on a predetermined method, so as to classify the union language model group into a plurality of clusters and generating cluster data representing one or more of the union language models included in each cluster. In the union language model preparation process, when a union language model is prepared for a certain language model, the program makes the computer execute the process of recording vocabularies included in the certain language model among the vocabularies included in the union data associated with occurrence frequencies of the vocabularies in the certain language model as entries in the union language model, and recording vocabularies not included in the certain language model among the vocabularies included in the union data associated with data showing that an occurrence frequency is 0 as entries in the union language model.

According to the present invention, a clustering system capable of clustering language models in which vocabulary occurring in speech uttered by or text written by a plurality of speakers are collected can be provided, and such a clustering method and a clustering program can be provided.

Embodiment 1

FIG. 1 is a functional block diagram showing the configuration of a clustering system and an attribute estimation system according to the present embodiment. An attribute estimation system 2 of FIG. 1 includes an input unit 21, a score calculation unit 22 and an attribute estimation unit 23, and is connected with a unit for recording a language model group subjected to clustering (hereinafter called a clustered language model group recording unit) 103. A clustering system 1 includes a clustering unit 14, an entry deletion unit 13 and a union language model preparation unit 15, and is connected with a unit for recording a yet-to-be clustered language model group (hereinafter called a yet-to-be clustered language model group recording unit) 106 and the clustered language model group recording unit 103.

The attribute estimation system 2 and the clustering system 1 can be implemented by installing programs into a computer such as a personal computer, a server, a workstation or the like. That is to say, the functions of the input unit 21, the score calculation unit 22, the attribute estimation unit 23, the clustering unit 14, the entry deletion unit 13 and the union language model preparation unit 15 can be implemented by executing predetermined programs by a CPU of a computer. Therefore, a program for implementing by a computer the functions of the input unit 21, the score calculation unit 22, the attribute estimation unit 23, the clustering unit 14, the entry deletion unit 13 and the union language model preparation unit 15 as well as a recording medium for recording them also are embodiments of the present invention.

The yet-to-be clustered language model group recording unit 106 and the clustered language model group recording unit 103 can be implemented by a storage apparatus accessible from an internal storage device of a computer or this computer. Herein, the attribute estimation system 2 and the clustering system 1 may be configured with one computer or with a plurality of computers.

(Configuration of Clustering System)

The yet-to-be clustered language model group recording unit 106 includes a plurality of language models recorded therein. The respective language models are associated with attribute values representing human attributes. That is, each language model is provided for each attribute value representing a human attribute. Each language model has a plurality of entries including vocabularies appearing in voice uttered or text written by humans having an attribute of the attribute value associated with the language model and data representing occurrence frequencies of the vocabularies.

The attributes of humans are, for example, a nature of a human, a physical predisposition, habits, behaviors, a belonging organization, a social position and the like. An attribute value shows a human attribute using data. Specific examples of attribute values showing attributes include data representing ages, genders, occupations, job titles, annual income, living areas, working areas, schools, place of work, hobbies or family structures, or the combination of such data.

The clustering system 1 performs a clustering process with respect to a language model group recorded on the yet-to-be clustered language model group recording unit 106, and classifies the language model group into a plurality of subsets based on similarities between language models. Each subset is called a cluster. The clustering system 1 generates a language model corresponding to each cluster, and records the same as a language model subjected to clustering (hereinafter a clustered language model) on the clustered language model group recording unit 103.

Figure 2:
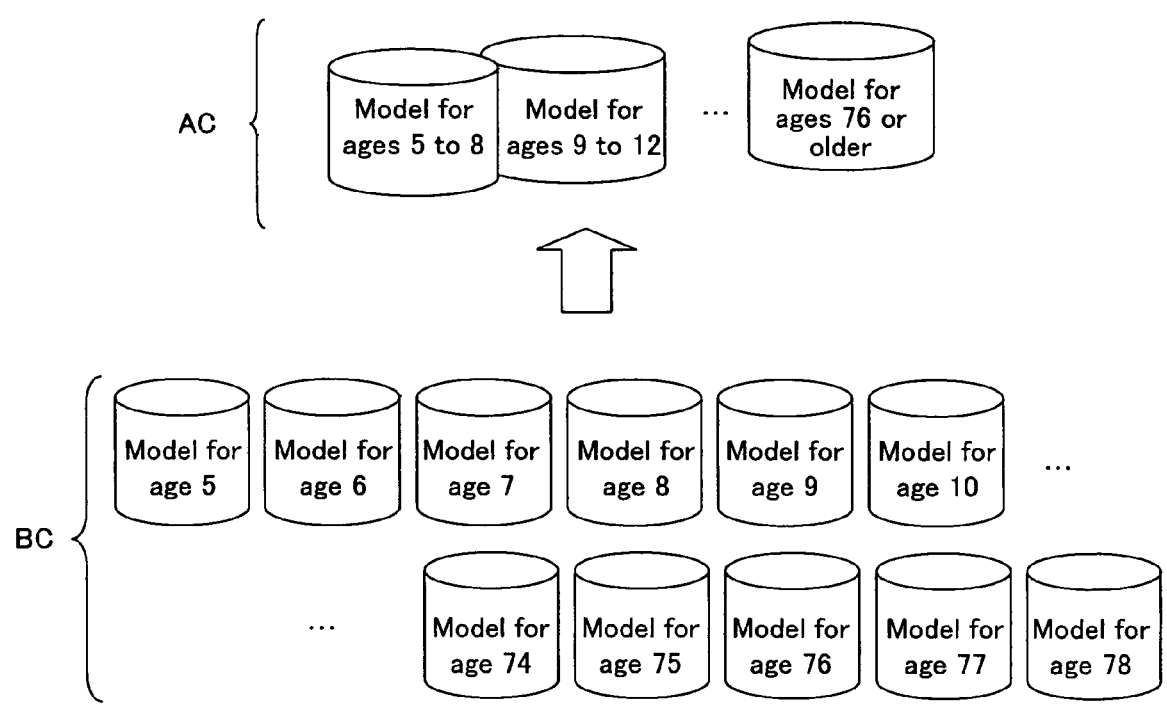
FIG. 2 is a drawing for explaining the clustering of a language model briefly.

Hereinafter a specific example of the clustering processing of language models will be described briefly. FIG. 2 is a drawing for explaining the clustering of language models briefly. FIG. 2 shows an example of a yet-to-be clustered language model group BC and an example of a clustered language model group AC. The yet-to-be clustered language model group BC of FIG. 2 is a set of language models prepared for every one-year-old age class.

For instance, a five-year-old language model contains data in which a large amount of vocabularies uttered by or written by one or more 5-year-old humans are recorded. The 5-year-old language model is recorded in a pair with an attribute value showing that an attribute (age in this example) of the human who utters the vocabulary contained in the language model is "5-year-old". In this way, each language model is recorded so as to be associated with an attribute value showing an attribute.

Further, each language model is composed of, for example, a set of entries including vocabularies and the occurrence frequencies of the vocabularies. Herein, an entry is the unit of data in a language model. In the present embodiment, one entry includes vocabularies and the occurrence frequencies of the vocabularies. However, data included in one entry is not limited to the above-stated vocabularies and the occurrence frequencies thereof.

As a method for collecting data as the base of a language model, various methods are available, for example, a large amount of human's natural vocalization may be recorded and written in the form of a transcript, corpus may be collected from document such as newspaper articles and magazines and recording media such as tapes, videos, CDs, DVDs and the like, and sentences from mail and chat may be collected.

With respect to a set of language models prepared for every one-year-old class (a yet-to-be clustered language model group), the clustering system 1 calculates a similarity of the distribution of included vocabularies between language models and classifies automatically them into a plurality of subsets (clusters) based on the similarity. Then, a language model corresponding to each subset (cluster) is generated as a clustered language model. When the above-stated yet-to-be clustered language model group is divided into subsets (clusters) using a well-known clustering method described later, a clustering method described later will be used. Thereby, a clustered language model group AC is prepared. The clustered language model group AC of FIG. 2 includes as one example clustered language models prepared for the age classes of ages 5 to 8, 9 to 12, ... 76 or older. That is to say, as a result of the clustering, a set of language models prepared for every one-year-old age class is classified into the respective clusters of ages 5 to 8, 9 to 12, ... 76 or older.

A clustered language model is recorded in a pair with an attribute value showing the corresponding attribute. For instance, a clustered language model for the age class of ages 5 to 8 is recorded so as to be associated with the attribute value showing that the ages are "5 to 8-year-old".

By automatically clustering a set of language models by calculating, attribute classes based on more appropriate statistical grounds can be obtained as compared with the case where a human sets attribute classes as he/she sees fit. That is to say, in the example of FIG. 2, the clustering system 1 can prepare the clustered language model group AC that is classified by the age classes with consideration given to the tendency of language changing in accordance with ages, based on the yet-to-be clustered language model group BC including a large amount of language data. Such a clustered language model group AC can be used effectively for the process of estimating ages from the input language information by the attribute estimation system 2.

That is the explanation of the example where the attribute value associated with each language model is data showing ages, i.e., the example where language models recorded in accordance with ages are clustered. However, the attribute values associated with the respective language models are not limited to data showing ages. In addition to ages, data showing genders, occupation, job titles, annual income, living areas, hobbies or family structures, or the combination of such data can be the attribute values associated with the respective language models.

For instance, when a language model for each prefecture is prepared, then speaker's hometown can be estimated. Further, when a yet-to-be clustered language model that is recorded for each country, state or prefecture is prepared, then the models are clustered, whereby a language model for each language or each dialect can be prepared. If sufficient amount of data can be collected, a model for each town can be used as the yet-to-be clustered language model group.

That is the brief description of the clustering process. Next, the respective functional blocks of the clustering system 1 will be described below.

In the clustering system 1, the union language model preparation unit 15 prepares a union data representing a union of vocabularies included in the yet-to-be clustered language model group, and prepares a union language model using the union data. The union language model preparation unit 15 compares the union data with each language model included in the yet-to-be clustered language model group. In the case where each language model includes vocabularies corresponding to the vocabularies included in the union data, the vocabularies and the occurrence frequencies in the language model are output to the entries of the union language model of that language model. In the case where there is no corresponding vocabulary, the vocabularies and 0 as the occurrence frequency are output to the entries of the union language model. Thereby, a union language model corresponding to each language model included in the yet-to-be clustered language models can be prepared. That is, a union language model corresponding to a plurality of attribute values can be prepared.

The clustering unit 14 performs clustering with respect to the union language model group prepared by the union language model preparation unit 15. As a result, the union language model group is classified into a plurality of clusters in accordance with the attributes, and cluster data representing each cluster is generated.

The cluster data is data for specifying a union language model included in each cluster. For instance, the cluster data includes data indicating a language model, a union language model, human attributes or the like included in each cluster.

The clustering unit 14, based on the cluster data and the union language model group, generates a clustered language model corresponding to each cluster. The generated plurality of clustered language models are recorded as a clustered language model group on the clustered language model group recording unit 103.

The entry deletion unit 13 deletes entries with lower occurrence frequencies among the entries of the language models included in the clustered language model group. For instance, entries with occurrence frequencies less than a predetermined threshold value or entries other than the N-th top entries with higher occurrence frequencies may be deleted. As a result, the size of data recorded in the clustered language model group recording unit 103 can be reduced. Herein, instead of deleting entries with lower occurrence frequencies simply, entries that can characterize a language model can be left. For instance, the entry deletion unit 13 can leave an entry that appears only in a specific language model, even when the occurrence frequency of the entry is less than the threshold value.

(Configuration of Attribute Estimation System)

The following describes the configuration of the attribute estimation system 2 of FIG. 1. The attribute estimation system 2 receives input human's language information, and outputs attribute information indicating an attribute of the human. The attribute estimation system 2, for example, receives language information uttered by a human from a host program such as a voice interaction application, estimates an attribute of the human and returns data representing the attribute to the host program. Further, the attribute estimation system 2 performs a process of estimating human attributes using the clustered language models generated by the clustering system 1.

In the attribute estimation system 2, language information is input to the input unit 21. The language information input at the input unit 21 is, for example, text data representing vocabularies of the human as a target of the attribute estimation, text data representing one or more sentences input by the human or the like. At the input 21, for instance, text data obtained by converting voice of a speaker input with a microphone or the like by a speech recognition system or the like may be read in as the language information. Alternatively, text data obtained as characters input by a speaker with an input device such as a keyboard, ten key and tablet may be read in as the language information.

The score calculation unit 22 calculates a score (likelihood) indicating the occurrence frequencies of vocabularies in the language information input at the input unit 21 for each clustered language model corresponding to each cluster recorded in the clustered language model group recording unit 103. Thereby, a score for each cluster can be calculated. A score can be calculated for each language model by comparing vocabularies included in each clustered language model and vocabularies indicated by the input language information.

The attribute estimation unit 23, based on the score for each cluster calculated by the score calculation unit 22, generates data indicating human's attributes. The attribute estimation unit 23, for example, can set as the human's attribute the attribute corresponding to the language model with the highest score among the clustered language models. The data indicating the human's attribute is returned to a host program. Further, the data indicating the attribute may be output through an output device such as a display, a printer, a speaker or the like.

(Operation Example of Clustering System 1)

Figure 3:
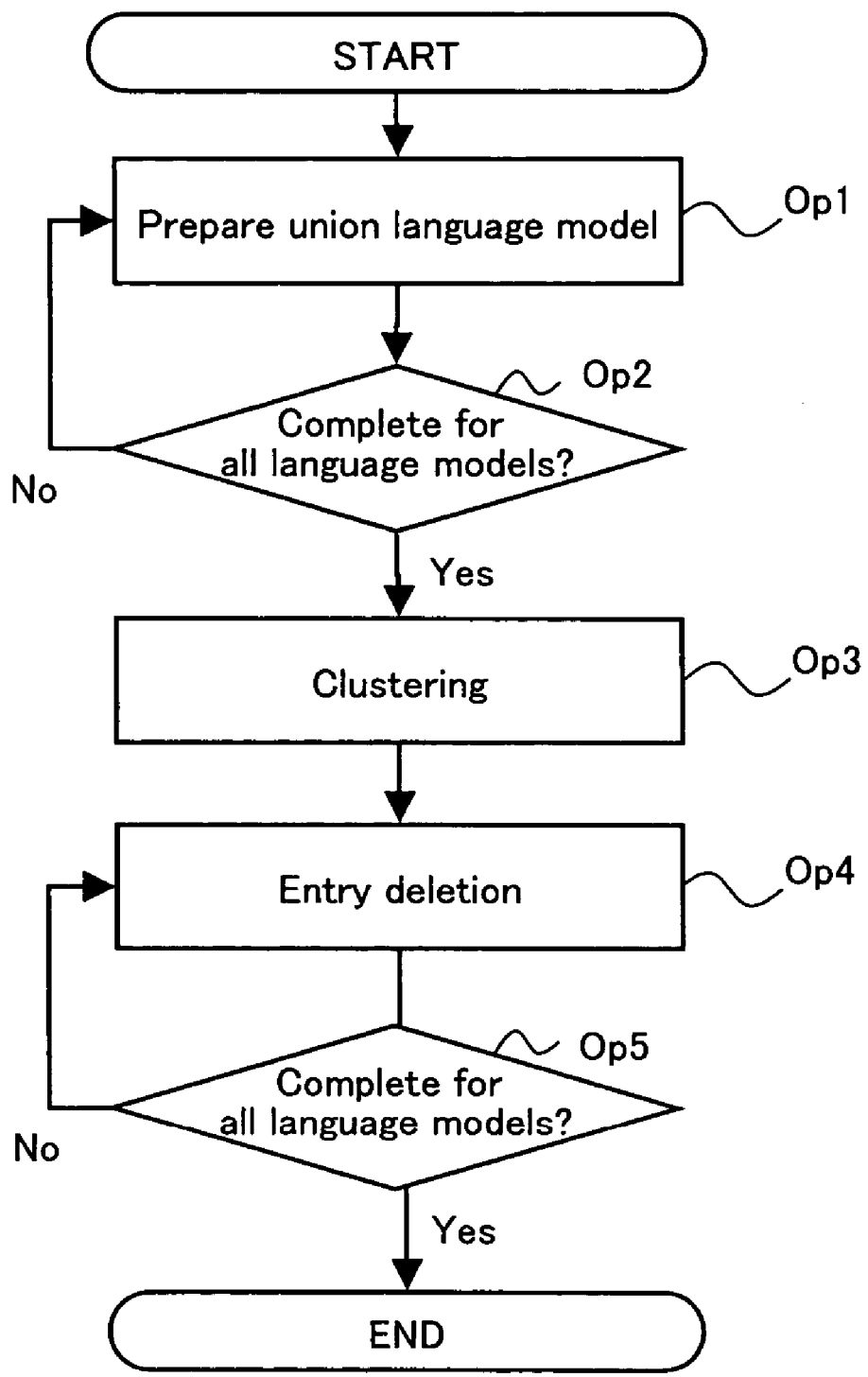
FIG. 3 is a flowchart showing an exemplary process of clustering language models.

The following describes an operation example of the clustering system 1. FIG. 3 is a flowchart showing an exemplary process of clustering language models by the clustering system 1.

Firstly, the union language model preparation unit 15 prepares a union language model for each of the plurality of language models recorded on the yet-to-be clustered language model group recording unit 106 (Op1, Op2: No).

A process for preparing a union language model for one language model will be described below. Firstly, the union language model preparation unit 15 generates union data representing a union of the vocabularies included in language models stored in the yet-to-be clustered language model group recording unit 106. Among the vocabularies included in the union data, the vocabularies included in the above-stated language model are associated with the occurrence frequencies of the vocabularies represented by the language model, and are recorded as entries of the union language model, whereas the vocabularies that are not included in the language model are associated with data representing that the occurrence frequency is 0, and are recorded in entries of the union model. Thereby, a union language model concerning the language models can be prepared. A specific example of the process for preparing a union language model will be described later.

When the preparation of the union language models is completed (Op2: Yes), the clustering unit 14 performs clustering with respect to the union language models prepared for a plurality of language models, based on a predetermined method (Op3). As a result of the clustering, the union language models are automatically classified into a plurality of clusters, and cluster data representing each cluster is generated. As the above-stated predetermined method, a well-known clustering algorithm can be used.

As a clustering algorithm used for the clustering process, a famous one is K-means clustering, for example. The K-means clustering for example is described in "Pattern recognition and learning algorithm", (written by Yoshinori UESAKA and Kazuhiko OZEKI, Bun-ichi sogo shyuppan, May, 10, 1990, pp. 109 to 119). In this book, LBG algorithm is described, which is substantially the same as the algorithm of K-means clustering.

The following describes an exemplary process for clustering of a union language model group using K-means clustering. Firstly, the clustering unit 14 classifies the union language model group into a predetermined number of clusters. The clustering unit 14 determines a weighted center (e.g., average) of the union language models included in each cluster. The clustering unit 14 calculates a similarity between the union language models of the union language model group and an average of each cluster (e.g., a distance), and classifies the union language model group into a predetermined number of clusters so that each union language model can belong to the cluster having the closest average. In this way, a process of determining an average for each cluster and performing classification again into a predetermined number of new clusters based on the average is repeated until the clusters become unchanged. Thereby, the union language model group can be clustered automatically so that a difference in the similarities between union language models belonging to the same cluster can be minimized and a difference in the similarities between union language models belonging to different clusters can be maximized.

In such an algorithm, the calculation for determining a distance between models and their weighted center (average) is necessary for the model group as a target of the classification. By preparing the above-stated union language model, such a calculation can be performed. An exemplary calculation of determining a distance between models and their weighted center (average) will be described later.

The clustering unit 14 generates, based on the cluster data and union language models included in each cluster indicated by the cluster data, a language model corresponding to each cluster (clustered language model). The clustered language model is recorded on the clustered language model group recording unit 103.

The clustering unit 14 determines an average model of a plurality of union language models included in a cluster, for example, and can set the average model as a clustered language model. Herein, in the average model of the plurality of union language models, each vocabulary included in union language models and the average occurrence frequency of each vocabulary are recorded. The average occurrence frequency of one vocabulary can be an average of the occurrence frequencies of that vocabulary in a plurality of union language models included in the cluster. An exemplary process of determining an average model of union language models will be described later.

Specific examples of the clustered language model are as described in FIG. 2. In the example of FIG. 2, the yet-to-be clustered language model group BC provided for each attribute (age) of every one-year-old age from ages 5 to 78 is clustered into the cluster of ages 5 to 8, the cluster of ages 9 to 12, . . . the cluster of ages 76 or older. A clustered language model is generated for each cluster. That is, a language model for ages 5 to 8, a language model for ages 9 to 12, . . . a language model for 76 or older are generated. In another example, a yet-to-be clustered language model group provided each prefecture in Japan is clustered into a group of some prefectures, such as a cluster including a language model of Tokyo, Kanagawa and a cluster including a language model of Osaka, Hyogo, . . . and the like.

As still another example, a yet-to-be clustered language model group provided for each state of the U.S. is clustered into a group of some states, such as a cluster including a language model of Texas, New Mexico, and Oklahoma, a cluster including a language model of New York, Pennsylvania and New Jersey, a duster including a language model of California, Oregon, Washington, . . . and the like.

With respect to a clustered language model generated by the above-stated clustering process (Op3), the entry deletion unit 13 deletes a part of the entries included in the clustered language model in accordance with predetermined judgment criteria (Op4). The entry deletion unit 13 may delete an entry with a low occurrence frequency included in the clustered language model. This entry deletion process is performed for all of the clustered language models, i.e., all of the clusters (Op5).

As an exemplary entry deletion process, a process of deleting entries with occurrence frequencies less than a predetermined threshold value, and a process of leaving higher-rank entries with higher occurrence frequencies and deleting the remaining entries are available. Specific examples of these processes are shown in FIG. 4 and FIG. 5.

Figure 4:
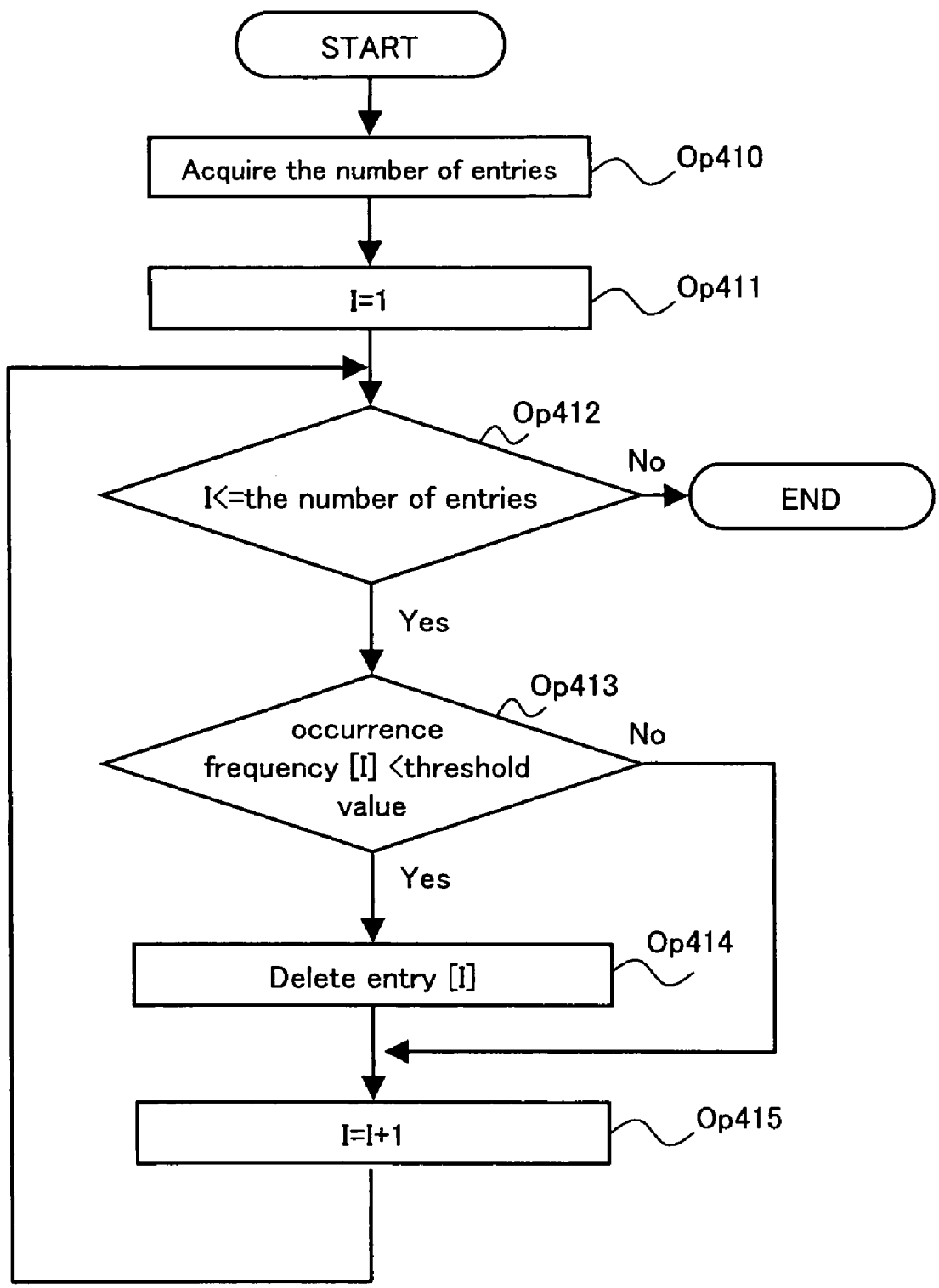
FIG. 4 is a flowchart showing an exemplary process of entry deletion.
Figure 5:
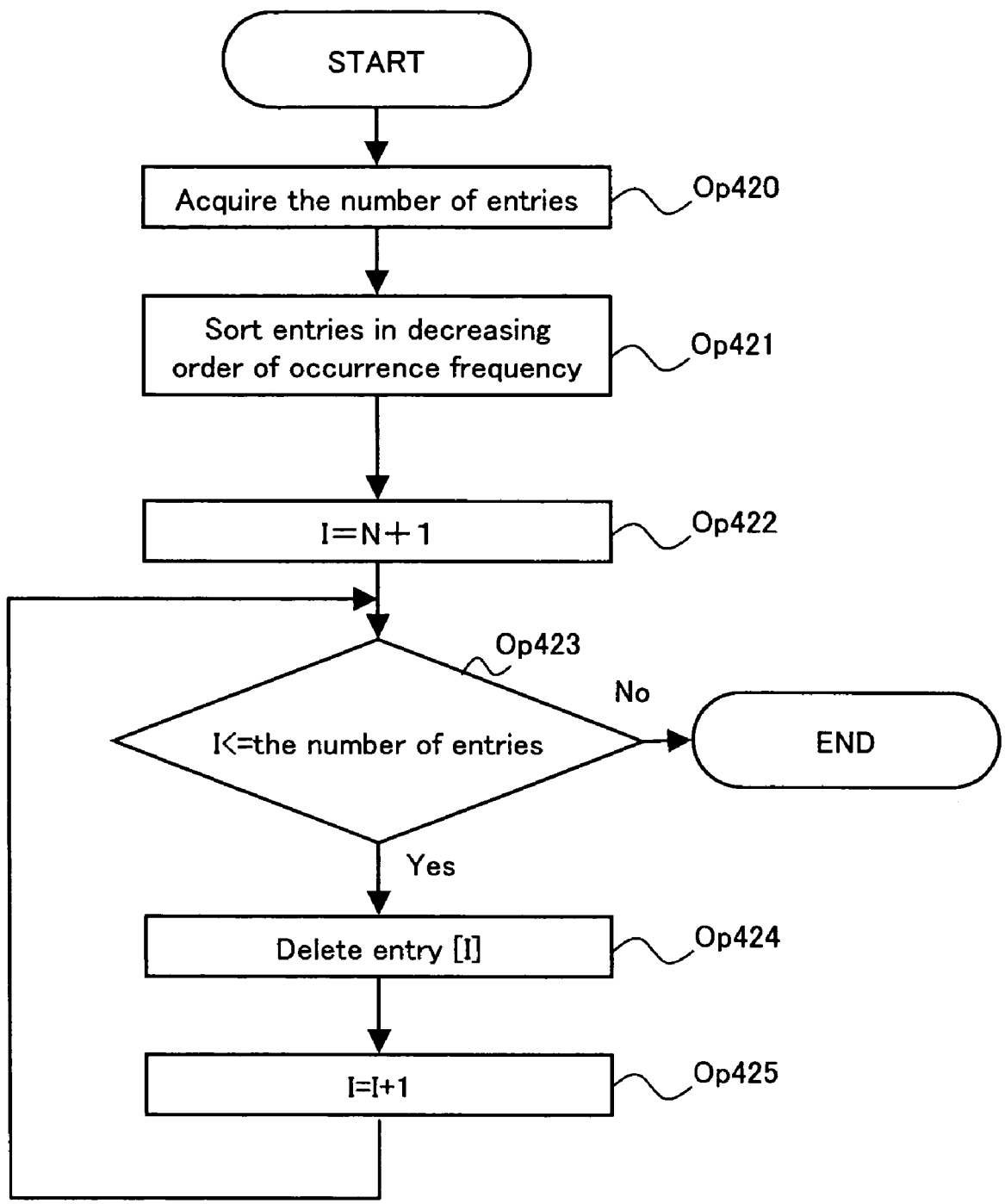
FIG. 5 is a flowchart showing another exemplary process of entry deletion.

FIG. 4 is a flowchart showing an exemplary process by the entry deletion unit 13 to delete entries with occurrence frequencies less than a predetermined threshold value among entries included in one clustered language model. Firstly, the entry deletion unit 13 acquires the number of entries included in the clustered language model (Op410). The entry deletion unit 13 initializes the variable I indicating the I-th entry in the clustered language model into "1" (Op411). The entry deletion unit 13 judges as to whether the variable I is smaller or not than the number of entries in the clustered language model (Op412). If the variable I is smaller than the number of entries (Yes at Op412), the process of Op413 is performed. If the variable I is larger than or equal to the number of entries (No at Op412), the process for the clustered language model is finished.

At Op413, the entry deletion unit 13 judges as to whether the occurrence frequency recorded in the I-th entry in the clustered language model (=occurrence frequency [I]) is smaller or not than the threshold value (Op413). Only in the case where the occurrence frequency [I] is smaller than the threshold value (Yes at Op413), the entry deletion unit 13 deletes the I-th entry (entry [I]) (Op414). Thereafter, the entry deletion unit 13 adds 1 to the variable I (Op415) and repeats the process of Op412.

The threshold value used at Op413 is for example recorded beforehand on a recording device provided in the clustering system 1. The threshold value may be determined by a designer, or determined by calculation based on the size of the clustered language model, the distribution of occurrence frequencies and the like.

As a result of the process of FIG. 4, the entry deletion unit 13 can judge as to whether the occurrence frequencies (represented with a probability, for example) of all of the entries included in one clustered language model are smaller or not than the threshold value and can delete entries with occurrence frequencies smaller than the threshold value. The process of FIG. 4 is performed for all of the language models recorded in the clustered language model group recording unit 103.

FIG. 5 is a flowchart showing an exemplary process by the entry deletion unit 13 to leave only higher-rank entries with higher occurrence frequencies and delete the remaining entries in one clustered language model. Firstly, the entry deletion unit 13 acquires the number of entries in the clustered language model (Op420). The entry deletion unit 13 sorts the entries included in the clustered language model in decreasing order of the occurrence frequency (Op421). Next, the entry deletion unit 13 initializes the variable I into "N+1" (Op422). Herein, N denotes the number of entries to be left, and is a numerical value recorded beforehand in a recording device or the like provided in the clustering system 1. That is, among the entries sorted at Op421, the entries of the N+1 th or later will be a target of the deletion.

In the case where an allowable maximum data size of the clustered language model group as a whole is fixed, for example, the entry deletion unit 13 may determine the value of N by calculation so that the clustered language models do not exceed the above-stated allowable maximum data size. Thereby, entries with lower occurrence frequencies can be deleted with consideration given to the allowable data size of the clustered language model group as a whole.

The entry deletion unit 13 judges as to whether the variable I is smaller or not than the number of entries of the clustered language model (Op423), and if the variable I is smaller than the number of entries (Yes at Op423), the process of Op424 is performed. If the variable I is larger than or equal to the number of entries (No at Op423), the process for the clustered language model is finished.

At Op424, the entry deletion unit 13 deletes the I-th entry in the clustered language model (entry [I]) (Op424). Thereafter, the entry deletion unit 13 adds 1 to the variable I (Op425) and repeats the process of Op423.

As a result of the process of FIG. 5, the entry deletion unit 13 can leave only higher-rank N-th entries with higher occurrence frequencies and delete the remaining entries with respect to all of the entries included in one clustered language model. The process of FIG. 5 is performed for all of language models recorded in the clustered language model group recording unit 103. That is the specific examples of the entry deletion process.

As a result of the entry deletion process (Op4), the data size of the clustered language model can be adjusted. Then, as a result of the above-stated process of Op1 to Op5 of FIG. 3, yet-to-be clustered language models are clustered, whereby clustered language models in an appropriate data size can be recorded. The clustered language models will be used in the process of estimating human's attributes by the attribute estimation system, which will be described later.

(Specific Example of Union Language Model Preparation)

Figure 6:
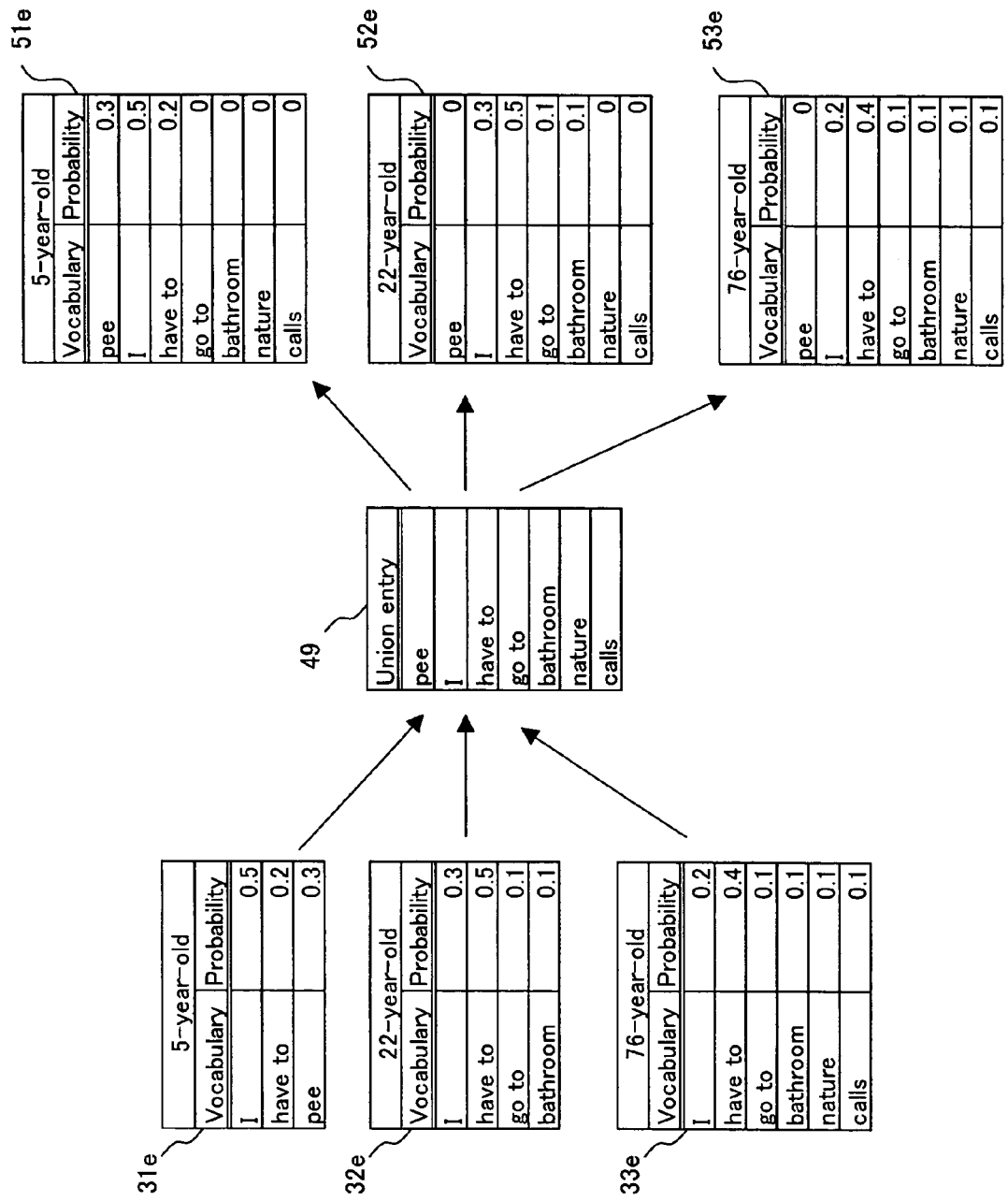
FIG. 6 shows an example of the data configuration of yet-to-be clustered language models, a union entry and union language models.

Referring now to FIG. 6, a specific example of a union language model in English will be described below. FIG. 6 shows an example of the data configuration of yet-to-be clustered language models, a union entry and union language models. In FIG. 6, as one example of the yet-to-be clustered language model, a language model 31*e* for speakers aged 5, a language model 32*e* for speakers aged 22, a language model 33*e* for speakers aged 76 (hereinafter called a language model 31*e*, a language model 32*e* and a language model 33*e*, respectively) are shown. The respective language models 31*e*, 32*e* and 33*e* are recorded so as to be associated with speaker's attributes, i.e., data representing "5-year-old", "22-year-old" and "76-year-old", respectively. In this example, in order to simplify the description, three language models for 5-year-old, 22-year-old and 76-year-old are exemplified as the yet-to-be clustered language models. However, the yet-to-be clustered language models are not limited to these three, and for instance, language models provided for every one-year-old age from ages 1 to 76 can be used.

In the example of FIG. 6, the language models 31*e*, 32*e* and 33*e* are composed of a plurality of entries, each entry including a vocabulary appearing in each speaker and a probability representing the occurrence frequency as one set. For instance, in the language model 31*e* for speakers aged 5, three vocabularies "I", "have to" and "pee" are included as the vocabularies uttered by speakers aged 5, and data showing a probability of occurrence is associated with each vocabulary.

Herein, a union of the vocabularies included in the three language models 31*e*, 32*e* and 33*e* are seven vocabularies "I", "have to", "pee", "go to", "bathroom", "nature" and "calls". Data including this union as entries is a union entry 49. In this way, a union entry is data including entries obtained by collecting all of the vocabularies appearing in a yet-to-be clustered language model group. The union language model preparation unit 15 prepares a union language model having this union entry 49 for each of the three language models 31e, 32e and 33e.

Note here that in this example the union entry includes the union of the vocabularies as a whole included in the languages models 31e, 32e and 33e. However, the union entry may be a part of the union of the vocabularies. For instance, data including as the entries five vocabularies "I", "go to", "bathroom", "nature", and "calls", which are a part of the seven vocabularies of the union, may be the union entry. In this case, the union language model preparation unit 15 prepares a union language model having this union entry that includes the five vocabularies for each of the three language models 31e, 32e and 33e. In this way, when a part of the vocabularies in the union is included in the union entry, the vocabularies to be included in the union entry may be determined based on the occurrence frequencies of the vocabularies. For instance, vocabularies with relatively lower occurrence frequencies than those of other vocabularies can be deleted from the union entry.

FIG. 6 shows as an example of the generated union language model a union language model 51e for speakers aged 5, a union language model 52e for speakers aged 22 and a union language model 53e for speakers aged 76. The union language models 51e, 52e and 53e also are recorded so as to be associated with data representing attributes ("5-year-old", "22-year-old" and "76-year-old", respectively). The following describes an example where the union language model 51e is prepared for the language model 31e of the speakers aged 5. Since the language model 31e for speakers aged 5 has the entries of three vocabularies including "I", "have to" and "pee", probabilities of these vocabularies, "0.5", "0.2" and "0.3" are recorded as probabilities of the entries of the corresponding vocabularies in the union language model 51e. Since the remaining vocabularies "go to", "bathroom", "nature" and "calls" are not included in the language model 31e, the probability of "0" is associated with these vocabularies and they are recorded as entries in the union language model 51e.

Since the language model 32e for speakers aged 22 has the entries of four vocabularies including "I", "have to", "go to" and "bathroom", probabilities of these vocabularies, "0.3", "0.5", "0.1" and "0.1" are recorded as probabilities of the entries of the corresponding vocabularies in the union language model 52e. Since the remaining three entries "pee", "nature" and "calls" are not included in the language model 32e, the probability of "0" is associated with these vocabularies and they are recorded as entries in the union language model 52e. Since the language model 33e for speakers aged 76 has the entries of six vocabularies including "I", "have to", "go to", "bathroom", "nature" and "calls", probabilities of these vocabularies, "0.2", "0.4", "0.1", "0.1", "0.1" and "0.1" are recorded as probabilities of the entries of the corresponding vocabularies in the union language model 53e. The entry of the vocabulary "pee" is not included in the language model 33e, the probability of "0" is recorded.

Note here that in the example of FIG. 6 it appears that the respective language models 31e, 32e and 33e included in the yet-to-be clustered language model group have entries obtained from learning using only one sentence. However, this is for simplifying the example. In the actual language model, a larger amount of sentences will be used for learning of the probabilities, and therefore the number of entries reaches the order of several tens of thousands.

Further, although the language models of FIG. 6 are unigram, the language models are not limited to this, and may be bigram, trigram and the like. According to the bigram and the trigram, the occurrence frequencies of the order of a word also can be represented. For instance, in the case where the same word appears in a different order as in "I", "have to", "go to", "bathroom" and "bathroom", "I", "have to", "go to", the occurrence frequencies of the respective orders can be represented in the language model.

Further, in the example of FIG. 6, the data representing the occurrence frequency of the language model is a probability. However, instead of a probability, a value representing a probability with logarithm can be recorded in the language model as data representing the occurrence frequency, for example.

The thus prepared plurality of union language models have the same number of entries. That is, the plurality of union language models can be represented with the same dimensional vector. Therefore, in the clustering process, the calculation for determining a distance between a plurality of union language models and the average thereof can be conducted. Conventionally, the reason for the difficulty in clustering of a language model is that different language models include different vocabulary entries, and therefore they cannot be processed simply as the same dimensional vector.

More specifically, there exists a vocabulary in the yet-to-be clustered language model group that is included in one language model but is not included in another language model. These language models cannot be processed as the same dimensional vector. Thus, it is impossible to conduct the calculation for determining a distance between the language models and the average thereof.

In such a case, the union language model preparation unit 15 prepares a union language model for each language model so as to include a union of vocabularies included in a language model group. In each union language model, a vocabulary that is not included in the original language model is recorded so as to be associated with data representing that the occurrence frequency is 0. Thereby, the yet-to-be clustered language model group can be converted into a union language model group having the same dimensional vector. For that reason, the calculation required for clustering, for example, of determining a distance between language models and the average thereof can be conducted.

(Exemplary Calculation of Determining Distance Between Language Models and Average Thereof)

The following describes an example of the calculation of determining a distance between language models and an average thereof. A distance between language models and an average thereof are calculated in the clustering of FIG. 3 (Op3) and is used.

An example of a distance between language models used in the clustering includes a square of an Euclidean distance. For instance, with regard to a vector X $(X_1, X_2, X_3, \ldots X_{n-1}, X_n)$ having probabilities of the respective vocabularies in one language model Mx as their components and a vector Y $(Y_1, Y_2, Y_3, \ldots Y_{n-1}, Y_n)$ having probabilities of the respective vocabularies in another language model My as their components, the square of an Euclidean distance of the vector X and the vector Y will be as in the following (formula 1). Herein, in the following (formula 1), Xi denotes the i-th component of the vector X and Yi denotes the i-th component of the vector Y.

$$\sum_{i=1}^{n} (Xi - Yi)^2 \qquad \text{[formula 1]}$$

Herein, the calculation of determining a distance between the union language model 51e of speakers aged 5 and the union language model 52e of speakers aged 22 of FIG. 6 is described. Firstly, note the probability of "pee" as the first entry. Since the probability of "pee" in the union language model 51e is "0.3" and the probability of "pee" in the union language model 52e is "0", the square of the difference thereof will be as follows:

$$(0.3-0)^2=0.3^2=0.09$$

Next, note "I" as the second entry. The probability of "I" in the union language model 51e is "0.5" and the probability of "I" in the union language model 52e is "0.3". Therefore, the square of the difference thereof will be as follows:

$$(0.5-0.3)^2=0.2^2=0.04$$

In this way, the square of a difference of a probability of an entry in the union language model 51e and a probability of the corresponding entry in the union language model 52e is determined for all of the entries included in the union language model 51e. The sum of the thus determined square of a difference is the square of an Euclidean distance. In this example, that value is 0.24. That is, in the above [formula 1], in the case where Xi denotes the probability of the i-th entry in the union language model 51e and Yi denotes the probability of the i-th entry in the union language model 52e, the distance between the union language model 51e and the union language model 52e can be determined by the above-stated [formula 1].

Figure 7:
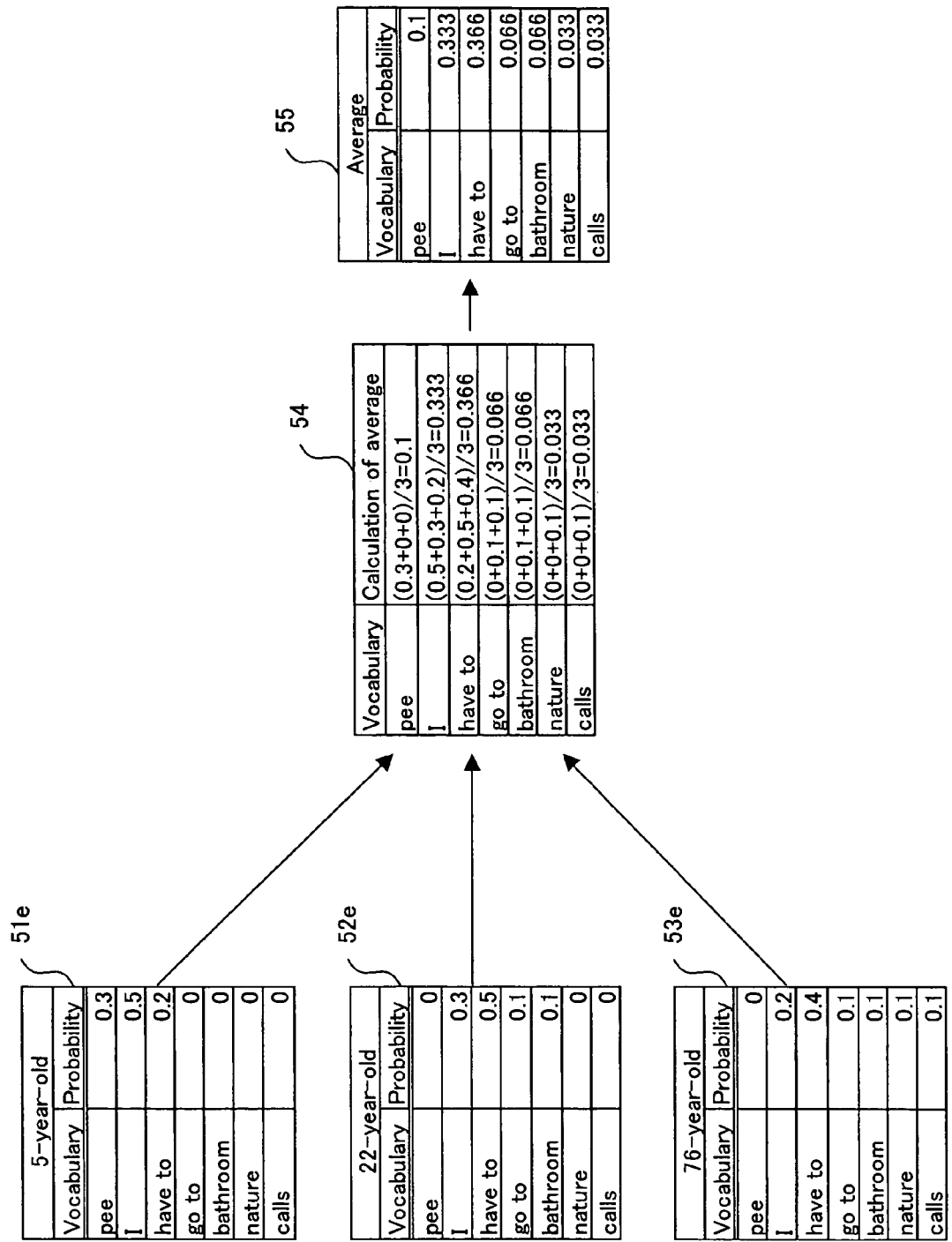
FIG. 7 is for explaining an example of the calculation of determining the average of a plurality of language models.

Next, an example of the process of determining the average between language models will be described below. In the following, the process of determining the average of language models by calculating the arithmetic average between language models will be described. FIG. 7 is for explaining the example of the calculation of determining the average of a plurality of language models. In the example of FIG. 7, the calculation performed in the course of determining the average of the union language models 51e, 52e and 53e of FIG. 6 is shown.

Firstly, note the probability of "pee" as the first entry. Since the probability of "pee" in the union language model 51e is "0.3", the probability of "pee" in the union language model 52e is "0", and the probability of "pee" in the union language model 53e is "0", the sum of these is calculated, which is then divided by 3 as the number of union language models as follows:

$$(0.3+0+0)/3=0.1$$

Thereby, the average of probabilities of "pee" in the union language models 51e, 52e and 53e is determined as "0.1". Next, note the probability of "I" as the second entry. Since the probability of "I" in the union language model 51e is "0.5", the probability of "I" in the union language model 52e is "0.3", and the probability of "I" in the union language model 53e is "0.2", the average of these is as follows, where the figures below the fourth decimal place are omitted:

$$(0.5+0.3+0.2)/3=0.333$$

In this way, the average is determined for all of the entries, whereby the average model can be obtained. Table 54 of FIG. 7 shows an example of the calculation for determining the average of the respective entries. A language model representing the average of the union language models 51e, 52e and 53e is the average model 55 of FIG. 7. That is, the average model 55 is the average union language model of speakers aged 5, 22 and 76.

The above-described calculation of determining a distance or an average between language models is used in the process by the clustering unit 14 where a union language model group is clustered and classified into a plurality of clusters (Op3 of FIG. 3). Further, the clustering unit 14 generates an average language model of the union language models included in a cluster, and this average language model can be a clustered language model corresponding to the cluster.

Moreover, as another example of the process of determining an average between language models, the following describes a method of determining a weighted average with consideration given to the occurrence number of vocabularies in the respective language models. The occurrence number of one vocabulary in the respective language models varies between the language models. For instance, the probability of the vocabulary "go to" in the union language model 52e of FIG. 7 is "0.1", and the probability of the vocabulary "go to" in the union language model 53e also is "0.1". Even when the probability is the same as in "0.1", the occurrence number may be different. For instance, in the case where the occurrence number of "go to" in the union language model 52e is 100 and the sum of the occurrence numbers of the vocabularies included in the union language model 52e is 1,000, the probability of "go to" becomes "100/1000=0.1". On the other hand, although the occurrence number of "go to" in the union language model 53e is only 10, since the sum of the occurrence numbers of the vocabularies included in the union language model 53e is 100, then the probability of "go to" also becomes "10/100=0.1". In such a case, by determining the average between language models with consideration given to the occurrence number, a more accurate average can be obtained.

When an average is determined with consideration given to the occurrence number, data indicating the occurrence number should be recorded beforehand in the respective language models so as to be associated therewith. As one example, the following describes the case where the sum of the occurrence numbers of the vocabularies included in a language model is recorded so as to be associated with the language model. For instance, in FIG. 7, it is assumed that "10" is recorded as the sum of the occurrence number of the vocabularies included in the union language model 51e, "20" is recorded as the sum of the occurrence number of the vocabularies included in the union language model 52e, and "30" is recorded as the sum of the occurrence number of the vocabularies included in the union language model 53e. When the average of these three union language models 51e, 52e and 53e are determined concerning the vocabulary "go to" with consideration given to the occurrence number, the weighted average can be calculated as follows, for example:

$$(0.2\times10+0.1\times20+0.1\times30)/(10+20+30)=0.14$$

In this way, the respective occurrence numbers are determined, which are divided by the total occurrence number, whereby the average probability can be determined with consideration given to a different occurrence number for each language model. Such a method preferably is used when the clustering unit 14 generates an average language model of union language models included in each cluster, so as to generate a clustered language model.

(Operation Example of Attribute Estimation System)

Figure 8:
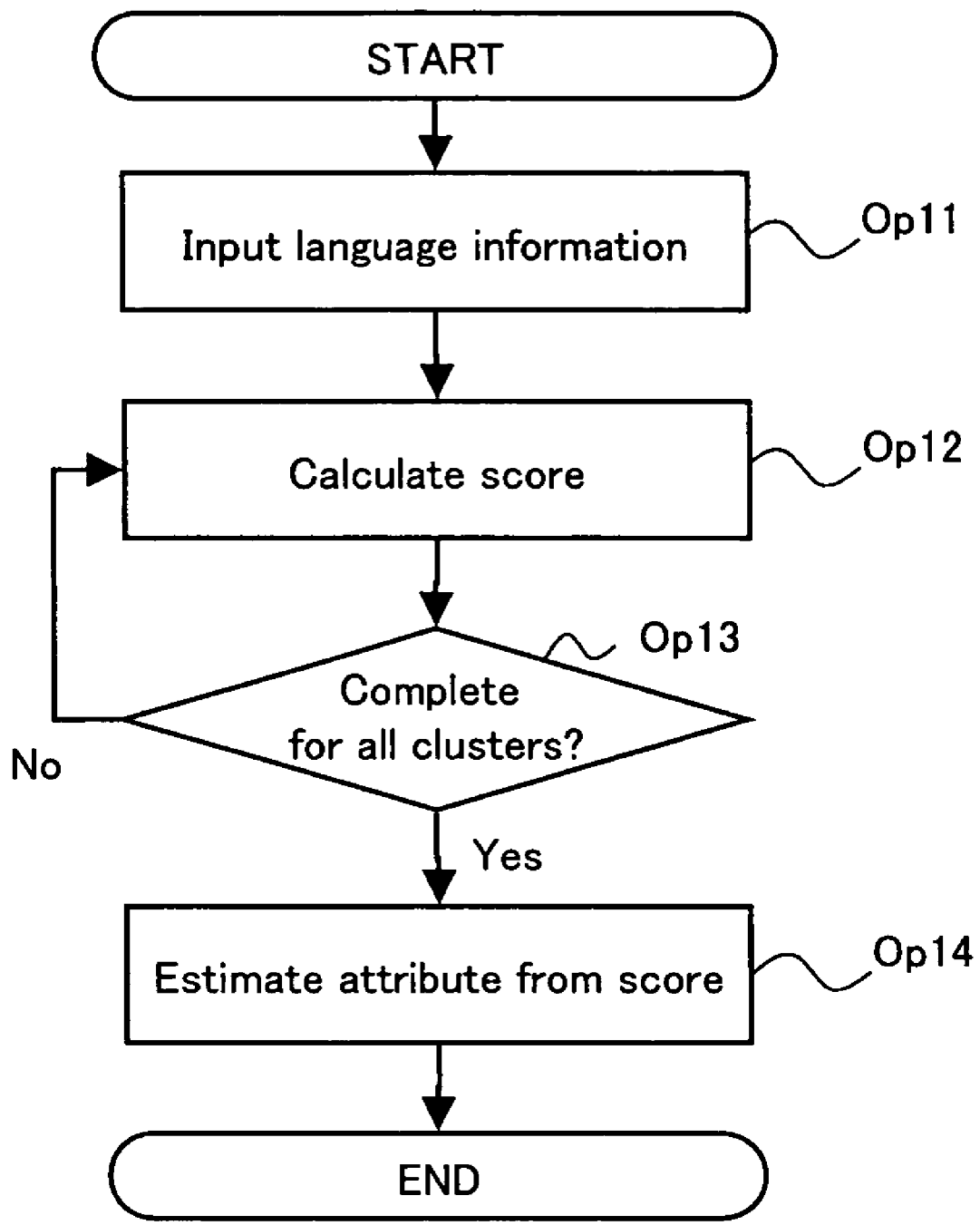
FIG. 8 is a flowchart showing an exemplary process of estimating attributes of speakers.

The following describes an operation example of the attribute estimation system 2. FIG. 8 is a flowchart showing an exemplary process by the attribute estimation system 2 to estimate attributes of speakers. Firstly, language information is input to the input unit 21 (Op11). The language information for example is input as text data representing vocabularies uttered by humans.

When the language information is input, the score calculation unit 22 calculates a score by comparing the input language information and the clustered language models (Op12). The score is calculated for all clusters subjected to clustering by the clustering system 1 (Op 13). Since a clustered language model is recorded for each cluster, a score can be calculated for each cluster by calculating the score for each clustered language model. The attribute estimation unit 23 estimates an attribute of the input language information using the score for each cluster (Op 14).

(Specific Example of Attribute Estimation Process)

Figure 9:
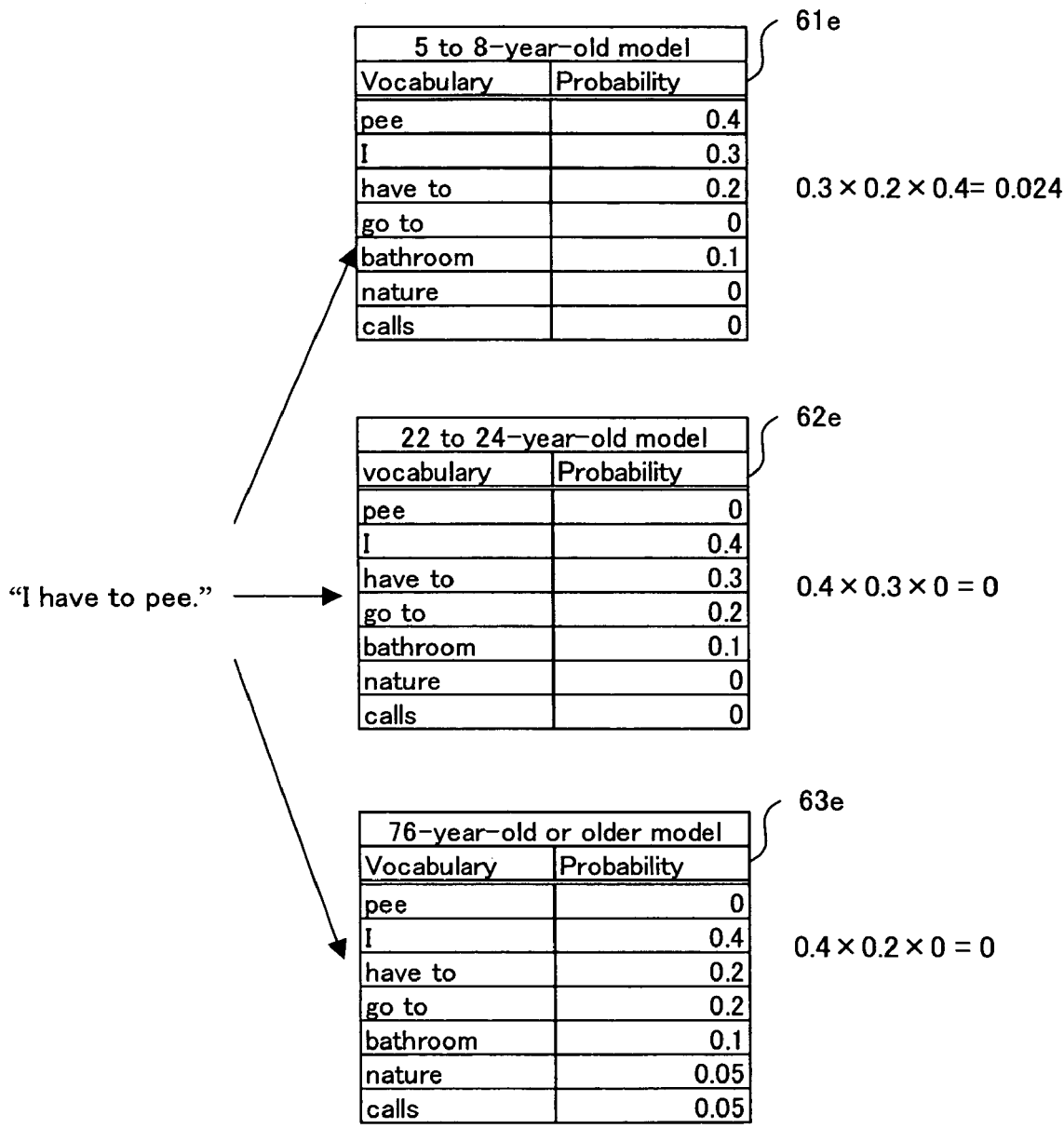
FIG. 9 is for explaining a specific example of an attribute estimation process.

The following describes a specific example of the attribute estimation process in the case where the input language information is English, with reference to FIG. 9. FIG. 9 shows as an example of the clustered language models generated by the clustering system 1 a language model 61e for ages 5 to 8, a language model 62e for ages 22 to 24 and a language model 63e for ages 76 or older. The following describes the example where, when the sentence of "I have to pee" is input in the form of text data as input language information, the score calculation unit 22 calculates a score for each of the language model 61e for ages 5 to 8, the language model 62e for ages 22 to 24 and the language model 63e for ages 76 or older.

The sentence of "I have to pee" consists of three vocabularies "I", "have to" and "pee". In the language model 61e for speakers aged 5 to 8, the probability of "I" is "0.3", the probability of "have to" is "0.2" and the probability of "pee" is "0.4". The score becomes the product of these probabilities, and therefore the probability obtained by the calculation using the language model 61e for speakers aged 5 to 8 becomes "0.024". In the language model 62e for speakers aged 22 to 24, since the probability of "I" is "0.4", the probability of "have to" is "0.3" and the probability of "pee" is "0", the score becomes "0" that is the product of these probabilities. In the language model 63e for speakers aged 76 or older, since the probability of "I" is "0.4", the probability of "have to" is "0.2" and the probability of "pee" is "0", the score becomes "0". Note here that although the above-description deals with the case of three clustered language models in order to simplify the description, the clustered language model group preferably is prepared so as to cover all of the ages in practical applications.

The attribute estimation unit 23 outputs the attribute of the language model with the best score among the language models 61e, 62e and 63e as the estimated attribute. In the example of FIG. 9, the score of the language model 61e for speakers aged 5 to 8 is "0.024", the score of the language model 62e for speakers aged 22 to 24 is "0", and the language model 63e for speakers aged 76 or older is "0". Therefore, the language model with the best score is the language model 61e for speakers aged 5 to 8. Therefore, the attribute estimation unit 23 outputs data showing "ages 5 to 8" as the attribute information.

Although this example deals with the estimation of ages, the case of estimating speaker's hometown also can be conducted in a similar manner. Further, a method for calculating a score and a method for estimating attributes are not limited to the above-stated specific example.

The above exemplifies the case where the output attribute information is data showing "ages 22 to 24". However, the data output by the attribute estimation system 2 is not limited to this. For instance, the attribute estimation unit 23 may output a score of each clustered language model together with the attribute corresponding to each clustered language model.

As a result of the above-stated process by the attribute estimation system 2, the attribute of speakers who speak the input language information can be estimated based on the language models clustered by the clustering system 1. That is, a yet-to-be clustered language model group is automatically clustered by the clustering system 1, so that attribute classes having more appropriate statistical basis can be obtained as compared with the case where a human determines attribute classes as he/she sees fit. As a result, an attribute estimation system 2 with a higher degree of precision can be constructed.

Embodiment 2

Figure 10:
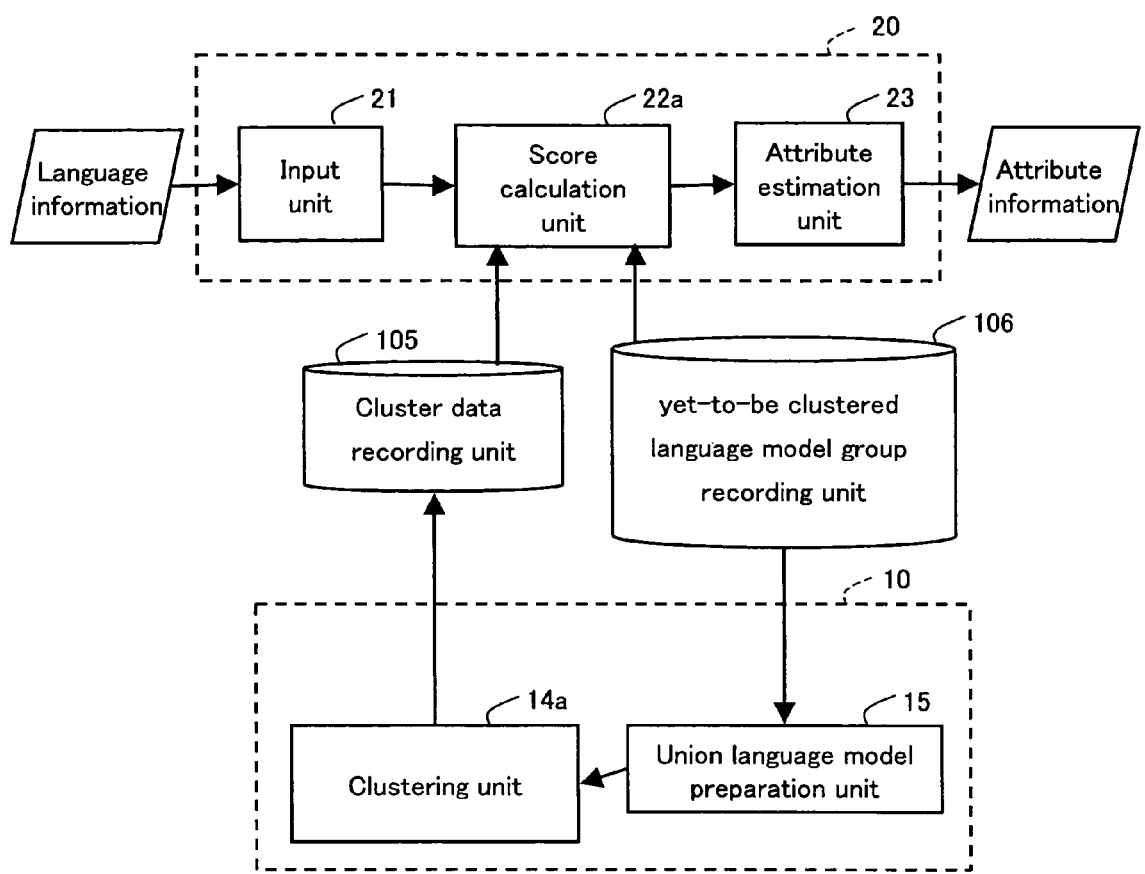
FIG. 10 is a functional block diagram showing the configuration of a clustering system and an attribute estimation system of Embodiment 2.

FIG. 10 is a functional block diagram showing the configuration of a clustering system 10 and an attribute estimation system 20 of the present embodiment. In FIG. 10, the same reference numerals are assigned to the same parts as in FIG. 1 to omit the detailed explanation.

A clustering unit 14a of the clustering system 10 records cluster data generated by a clustering process on a cluster data recording unit 105. Similarly to the cluster data of Embodiment 1, the cluster data is for specifying language models or union language models included in each cluster, which indicates speakers included in each cluster, speaker's attributes, language models, union language models or the like.

A score calculation unit 22a of the attribute estimation system 20 refers to the cluster data recorded on the cluster data recording unit 105 and yet-to-be clustered language models recorded on a yet-to-be clustered language model group recording unit 106, and calculates a score of each cluster shown by the cluster data. When the score calculation unit 22a calculates a score of input language information concerning a certain cluster, for example, the calculation unit 22a firstly acquires information indicating a language model included in the certain cluster from the cluster data. Based on the information, the score calculation unit 22a acquires data on the language model included in the certain cluster from the yet-to-be clustered language model group recording unit 106, and calculates a score by comparing with the input language information.

FIG. 11A shows an example of the cluster data recorded on the cluster data recording unit 105. The cluster data of FIG. 11A contains data in which an attribute of each cluster and language models included in each cluster are associated with each other and recorded. FIG. 11B shows an example of a yet-to-be clustered language model group recorded on the yet-to-be clustered language model group recording unit 106. The yet-to-be clustered language model group of FIG. 11B is a set of language models prepared for every one-year-old class from ages 5 to 78.

The following describes the case where, in the examples of FIGS. 11A and 11B, the score calculation unit 22a determines a score of the vocabulary "I" included in the input language information, concerning a cluster of ages 5 to 7. The score calculation unit 22a refers to the cluster data of FIG. 11A so as to obtain information representing language models included in the cluster having the attribute of ages 5 to 7. Herein, the cluster data shows that a language model for age 5, a language model for age 6 and a language model for age 7 are the language models included in the cluster of ages 5 to 7 (see FIG. 11A). The score calculation unit 22a acquires the probabilities of "I" of the language model 31a for age 5, the language model 31b for age 6 and the language model 31c for age 7 among these yet-to-be clustered language model group, i.e., "0.5", "0.5" and "0.5", and calculates of the average of these. This average is used for the calculation of a score. The following calculation of the score can be conducted in the method shown in Embodiment 1.

In the present embodiment, the clustering unit 14a does not generate a clustered language model but records cluster data only, whereby the amount of recorded data can be reduced. As a result, the capacity of a recording medium can be saved.

Embodiment 3

Figure 12:
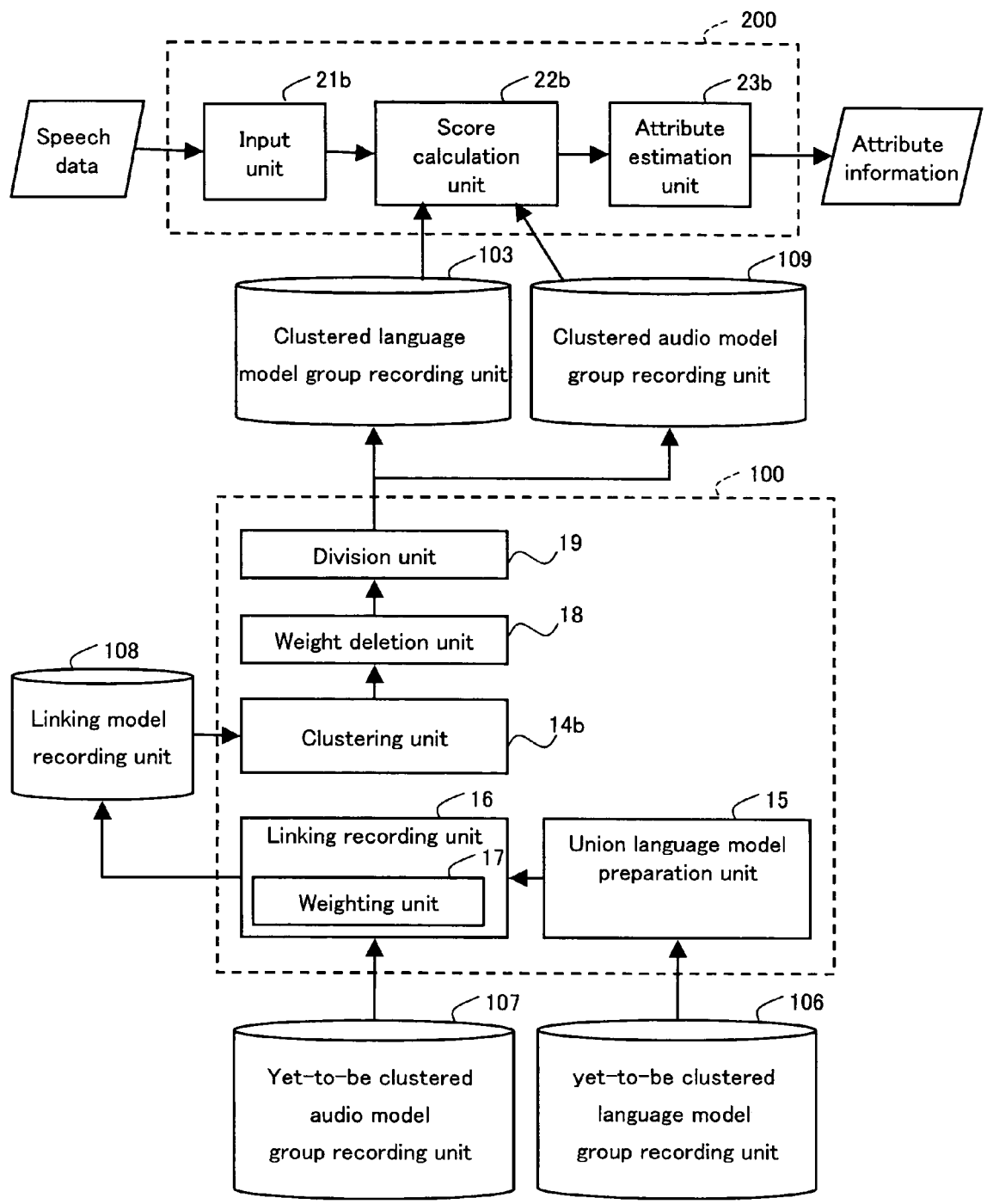
FIG. 12 is a functional block diagram showing the configuration of a clustering system and an attribute estimation system of Embodiment 3.

FIG. 12 is a functional block diagram showing the configuration of a clustering system 100 and an attribute estimation system 200 of the present embodiment. In FIG. 12, the same reference numerals are assigned to the same parts as in FIG. 1 to omit the detailed explanation.

(Configuration of Clustering System 100)

The clustering system 100 clusters yet-to-be clustered language models and such audio models, and generates clustered language models and clustered audio models. To this end, the clustering system 100 is configured to be capable of accessing a yet-to-be clustered language model group recording unit 106, a yet-to-be clustered audio model group recording unit 107, a clustered language model group recording unit 103 and a clustered audio model group recording unit 109. The clustering system 100 is provided with a union language model preparation unit 15, a linking recording unit 16, a clustering unit 14b, a weight deletion unit 18 and a division unit 19.

On the yet-to-be clustered audio model group recording unit 107, an audio model group including audio models corresponding to a plurality of attributes, respectively, is recorded. That is, each audio model is recorded so as to be associated with data indicating an attribute. Each audio model has a plurality of entries including audios included in human's voice having corresponding attributes and the occurrence frequencies of the audios.

The linking recording unit 16 links a union language model prepared by the union language model preparation unit 15 with the corresponding yet-to-be clustered audio model recorded on the yet-to-be clustered audio model group recording unit, and records it as a linking model on a linking model recording unit 108. The linking recording unit 16 associates an audio model having an attribute value with a union language model having the same attribute value, and records a linking model for each attribute value. The linking recording unit 16 further is provided with a weighting unit 17.

The weighting unit 17 multiplies at least one of data representing the occurrence frequencies included in entries of an audio model and data representing the occurrence frequencies included in entries of a union language model by a weighting factor so as to bring a dispersion of the occurrence frequencies in the audio model closer to a dispersion of the occurrence frequencies in the union language model.

The clustering unit 14b clusters a linking model group in the linking model recording unit 108 recorded by the linking recording unit 16. The clustering unit 14b classifies the linking model group into a plurality of clusters, and generates cluster data representing each cluster. The clustering unit 14b generates a clustered linking model corresponding to each cluster represented by the cluster data.

The weight deletion unit 18 performs a process of deleting weight with respect to entries in the clustered linking model, which have been subjected to weighting by the weighting unit 17. The weight deletion unit 18 deletes the weight of an entry by dividing the occurrence frequency, to which a weighting factor has been multiplied by the weighting unit 17, by the weighting factor, for example.

The division unit 19 divides the clustered linking model into a clustered language model and a clustered audio model. The clustered language model is recorded on the clustered language model group recording unit 103 and the clustered audio model is recorded on the clustered audio model group recording unit 109.

(Operation Example of Clustering System 100)

Figure 13:
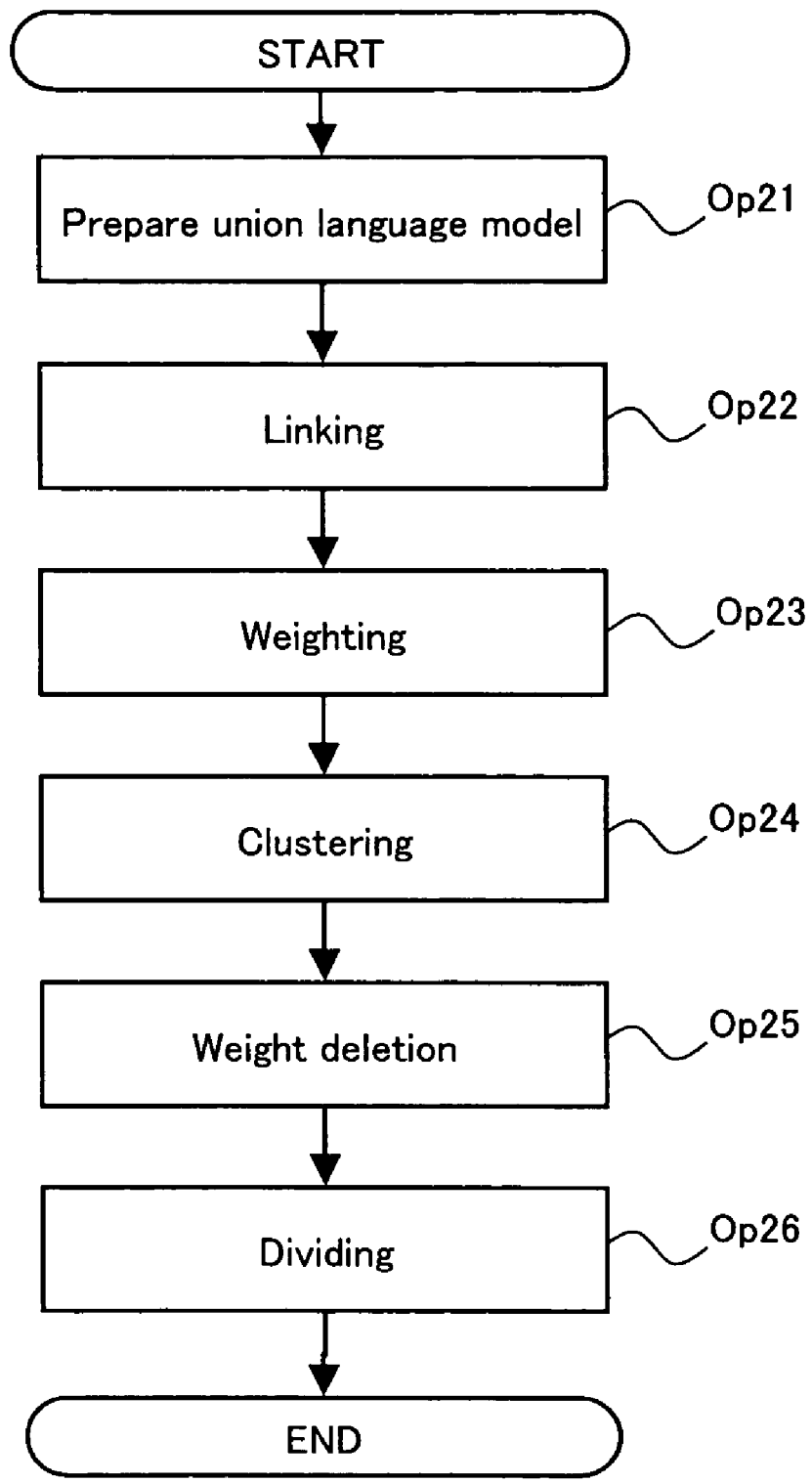
FIG. 13 is a flowchart showing an exemplary process of clustering language models and audio models.

The following describes an operation example of the clustering system 100. FIG. 13 is a flowchart showing an exemplary process by the clustering system 100 to cluster language models and audio models.

Firstly, the union language model preparation unit 15 prepares a union language model for each of a plurality of language models recorded on the yet-to-be clustered language model group recording unit 106 (Op21). The process of preparing a union language model is similar to the process described in Embodiment 1.

Next, the linking recording unit 16 links a union language model to a yet-to-be clustered audio model recorded on the yet-to-be clustered audio model group recording unit 107 (Op22). More specifically, the linking recording unit 16 associates a union language model with an attribute value and a yet-to-be clustered audio model with the same attribute value as that of the union language model, and records the same on the linking model recording unit 108. That is, a union language model and a yet-to-be clustered audio model having the same attribute value are associated with each other and recorded as a linking model. Thereby, during the clustering process, the clustering unit 14b can deal with one linking model as one vector containing values of the entries included in the linking model as components.

Note here that, preferably, an audio model group having the same attribute value as that of a language model in the yet-to-be clustered language model group recording unit 106 is recorded in the yet-to-be clustered audio model group recording unit 107. For instance, in the case where a union language model for age 22 is recorded in the yet-to-be clustered language model group recording unit 106, an audio model for age 22 is preferably recorded as the audio model group as well.

The weighting unit 17 multiplies at least one of the statistical values included in entries of the audio model and statistical values included in the union language model to be linked by a weighting factor (Op23). Thereby, the weighting unit 17 brings a dispersion of the occurrence frequencies in the yet-to-be clustered audio model closer to a dispersion of the occurrence frequencies in the union language model. The weighting factor may be a predetermined value or a value obtained by calculating using the dispersions of the occurrence frequencies of the audio model and the union language model. It is preferable that the weighting factor is the same value for all audio models and union language models having different attribute values.

If the weighting factor is a different value for each attribute value, the weight deletion unit 18 will have difficulty in deleting the weight.

The weighting factor may be a value determined by a human as he/she sees fit. In this case, the weighting factor can include the intention concerning importance is placed on which one of the language model and the audio model during clustering. If the weighting factor of the language model is made larger, the importance of the language model is increased, whereas if the weighting factor of the audio model is made larger, the importance of the audio model is increased. In such a case, when the same weighting factor is used for all of the attribute values, clustering can be performed with the same criterion.

Note here that in FIG. 13 the weighting process (Op23) is conducted after the linking process (Op22). However, the linking process (Op22) may follow the weighting process (Op23).

The following describes a specific example of the linking process (Op22) and the weighting process (Op23), with reference to FIG. 14. FIG. 14 shows a specific example of a yet-to-be clustered audio model, a union language model and a linking model. A yet-to-be clustered audio model 71 of FIG. 14 (hereinafter called audio model 71) is an audio model for speakers aged 22. The audio model 71 is such that the average from the first dimension to the n-th dimension and a value of the dispersion from the first dimension to the n-th dimension are recorded for each phoneme. A union language model 52e (hereinafter called language model 52e) is a union language model for speakers aged 22. The language model 52e is the same as the language model 52e exemplified in Embodiment 1 (FIG. 6).

A linking model 81 for speakers aged 22 (hereinafter called linking model 81) is an example of data in which the audio model 71 and the language model 52e are linked and recorded by the linking recording unit 16. Further, the linking model 81 is such that data obtained by multiplying a value of the audio model by the weighting factor "0.1" by the weighting unit 17 and data obtained by multiplying the probability of the language model 52e by the weighting factor "1.0" by the weighting unit 17 are associated with each other and recorded.

In the example of FIG. 14, since a value showing the occurrence frequency of a vocabulary in the language model is a probability, it is distributed from 0 to 1. However, the distribution of values in the audio model is not within the range from 0 to 1. That is to say, the distribution range of the values is different between the language model and the audio model. Then, the weighting unit 17 multiples a value of the audio model by the weighting factor "0.1" and multiplies a value of the language model by the weighting factor "1.0", so as to bring their distribution ranges closer to each other. Herein, the weighting unit 17 can compare the distribution range of values in the audio model 71 (e.g., the maximum value and the minimum value) with the distribution range of the probabilities in the language model, for example, and can calculate their weighting factors so as to bring their distribution ranges closer to each other. Further, in addition to the distribution range, the average, the dispersion, the standard deviation and the like of the values in the audio model 71 and the probabilities in the language model 52e may be used for the calculation of the weighting factors.

A linking model such as the linking model 81 is generated for each attribute (in this example, age). In the example of FIG. 14, the attribute (age) is only about a model for speakers aged 22. However, a linking model can be generated for every one-year-old age in a similar manner.

In this way, the weighting unit 17 multiplies each value in the language models included in the union language model group and in the audio models included in the yet-to-be clustered audio model group by weighting values. Then, the linking recording unit 16 links mutually corresponding language model and audio model as a vector. Note here that, in the example of FIG. 14, the contents of the audio model are simplified and shown for the sake of clarity. However, they are more complicated in actual applications in many cases. That is the specific example of the linking process (Op22) and the weighting process (Op23).

As a result of the linking process (Op22) and the weighting process (Op23) of FIG. 13, a linking model is recorded on the linking model recording unit 108. Then, the clustering unit 14b performs a clustering process with respect to the linking model (Op24). The clustering process is similar to the clustering process of Embodiment 1. As a result of the clustering, a plurality of linking models recorded on the linking model recording unit 108 are classified into a plurality of clusters, and a clustered linking model is generated for each cluster.

With respect to the clustered linking model, the weight deletion unit 18 deletes the weight by dividing the value included in the linking model by the weighting factor that has been multiplied by the weighting unit 17 (Op25). Further, the division unit 19 divides the clustered linking model into a clustered union language model and a clustered audio model (Op26). Since the clustered linking model is data such that the union language model and the audio model are associated with each other, the division unit 19 can divide it into the clustered union language model and the clustered audio model. The clustered union language model is recorded on the clustered language model group recording unit 103 and the clustered audio model is recorded on the clustered audio model group recording unit 109.

The following describes a specific example of the weight deletion process (Op25) and the division process (Op26), with reference to FIG. 15. FIG. 15 shows a specific example of a clustered linking model, a clustered audio model and a clustered language model that are generated by dividing the clustered linking model. A clustered linking model 83 of FIG. 15 (hereinafter called linking model 83) is a linking model for speakers aged 9 to 12. A clustered audio model 91 (hereinafter called audio model 91) is an audio model generated by dividing the linking model 83, which is then subjected to the weight deletion process. A clustered language model 101 (hereinafter called language model 101) is a language model generated by dividing the linking model 83.

In the example of FIG. 15, the weight deletion unit 18 divides values of entries corresponding to the audio model included in the linking model 83 by "0.1". This is the example where when the linking model as the basis of the linking model 83 is generated, the weighting unit 17 multiplies the audio model by the weighting factor "0.1". That is, since the audio model as the basis of the linking model 83 is obtained by multiplying by the weighting factor "0.1", the weight deletion unit 18 divides the values of the entries 83a corresponding to the audio model included in the linking model 83 by "0.1" so as to return the values to the state before the multiplication by the weighting factor. The division unit 19 makes a part of the entries 83a corresponding to the audio model of the linking model 83 and a part of the entries 83b corresponding to the language model of the linking model 83 into separate data. That is, the linking model 83 is divided into the audio model 91 and the language model 101. That is a specific example of the weight deletion process (Op25) and the division process (Op26).

In FIG. 13, the division process (Op26) is conducted after the weight deletion process (Op25). However, the weight deletion process (Op25) may follow the division process (Op26). Further, an entry deletion process (Op4, Op5 of FIG. 3) similar to Embodiment 1 may be conducted with respect to the clustered language model group recording unit 103.

That is an operation example of the clustering system 100. The clustered audio model and the clustered language model recorded by the process of FIG. 13 are used for the process by the attribute estimation system 200, which will be described later.

According to the clustering system 100 of the present embodiment, an audio model group and a language model group can be linked and clustered. When the audio model group and the language model group are clustered separately, different clusters will be generated between the audio model group and the language model group, thus leading to the possibility of the failure in attribute estimation using the both models. According to the present embodiment, the audio model group and the language model group can be clustered concurrently, and the same cluster can be surely generated for both of the model groups. Further, when performing clustering concurrently, adjustment as to importance of the clustering is placed on which one of the language model and the audio model can be made by weighting.

(Configuration of Attribute Estimation System 200)

The following describes the configuration of the attribute estimation system 200 of FIG. 12. The attribute estimation system 200 is a system of receiving an input of voice information uttered by a speaker and outputting information concerning an attribute of the speaker. The attribute estimation system 200, for example, receives language information uttered by a speaker from a host program such as a voice interaction application, estimates an attribute of the speaker and returns data representing the attribute to the host program. Further, the attribute estimation system 200 performs a process of estimating a speaker's attribute using the clustered language model and the clustered audio model generated by the clustering system 100.

In the attribute estimation system 200, speech data is input to the input unit 21b. The score calculation unit 22b calculates a score (likelihood) for each cluster, the score showing the occurrence frequency of the speech data input to the input unit 21b, based on the language model recorded on the clustered language model group recording unit 103 and the audio model recorded on the clustered audio model group recording unit 109. The detailed configuration of the score calculation unit 22b will be described later.

The attribute estimation unit 23b generates data showing the attribute of the speaker based on the score for each cluster calculated by the score calculation unit 22b. The attribute estimation unit 23b can set the attribute corresponding to the cluster with the highest score as the attribute of the speaker, for example.

(Detailed Configuration of Score Calculation Unit 22B)

Figure 16:
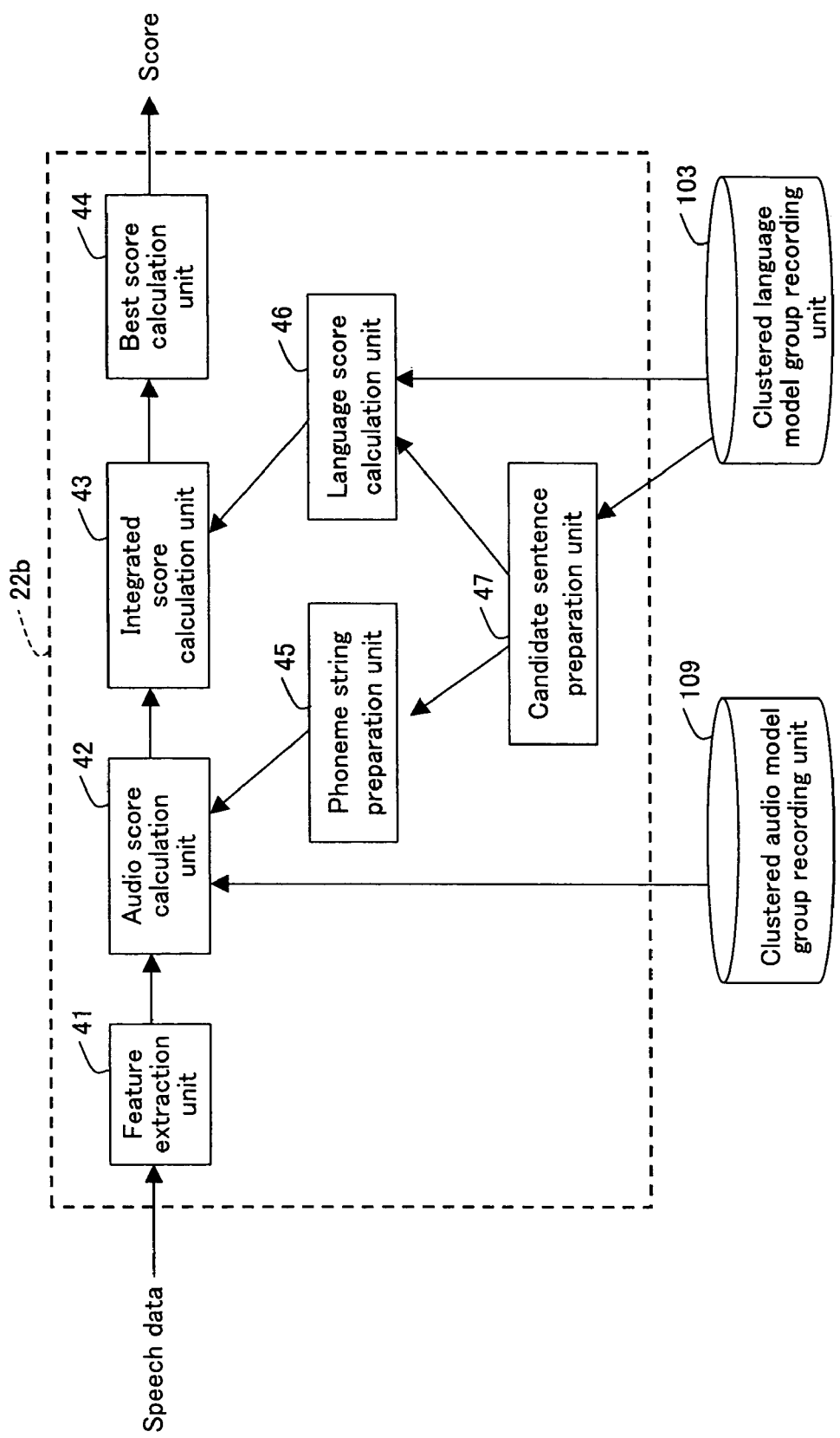
FIG. 16 is a functional block diagram showing the configuration of a score calculation unit.

FIG. 16 is a functional block diagram showing the configuration of the score calculation unit 22b. The score calculation unit 22b of FIG. 16 has a function of a dictation (random vocabulary voice listening) system. The dictation system calculates a score of input speech corresponding to the audio model and the language model having each attribute value using an algorithm of the dictation.

A candidate sentence preparation unit 47 prepares a plurality of candidate sentences for arbitrary clusters recorded in the clustered language model group recording unit 103 using vocabularies included in the clustered language models. A phoneme string preparation unit 45 prepares a phoneme string corresponding to each of the plurality of candidate sentences prepared by the candidate sentence preparation unit 47.

A feature extraction unit 41 receives an input of speech data and generates data showing a feature quantity of voice represented by the speech data. An audio score calculation unit 42 calculates an audio score of the voice represented by the input speech data for each phoneme string of the candidate sentences prepared by the phoneme string preparation unit 45, using the data indicating a feature quantity generated by the feature extraction unit 41 and the clustered audio model for the cluster recorded in the clustered audio model group recording unit 109.

A language score calculation unit 46 calculates a language score for each of the plurality of candidate sentences prepared by the candidate sentence preparation unit 47, using the clustered language model for the cluster. An integrated score calculation unit 43 calculates an integration score for each candidate sentence, where the integrated score includes the integration of the audio score calculated by the audio score calculation unit 42 and the language score calculated by the language score calculation unit 46. A best score calculation unit 44 outputs the best score among the integration scores calculated for the respective candidate sentences as the score of the attribute corresponding to the cluster.

(Operation Example of Attribute Estimation System 200)

Figure 17:
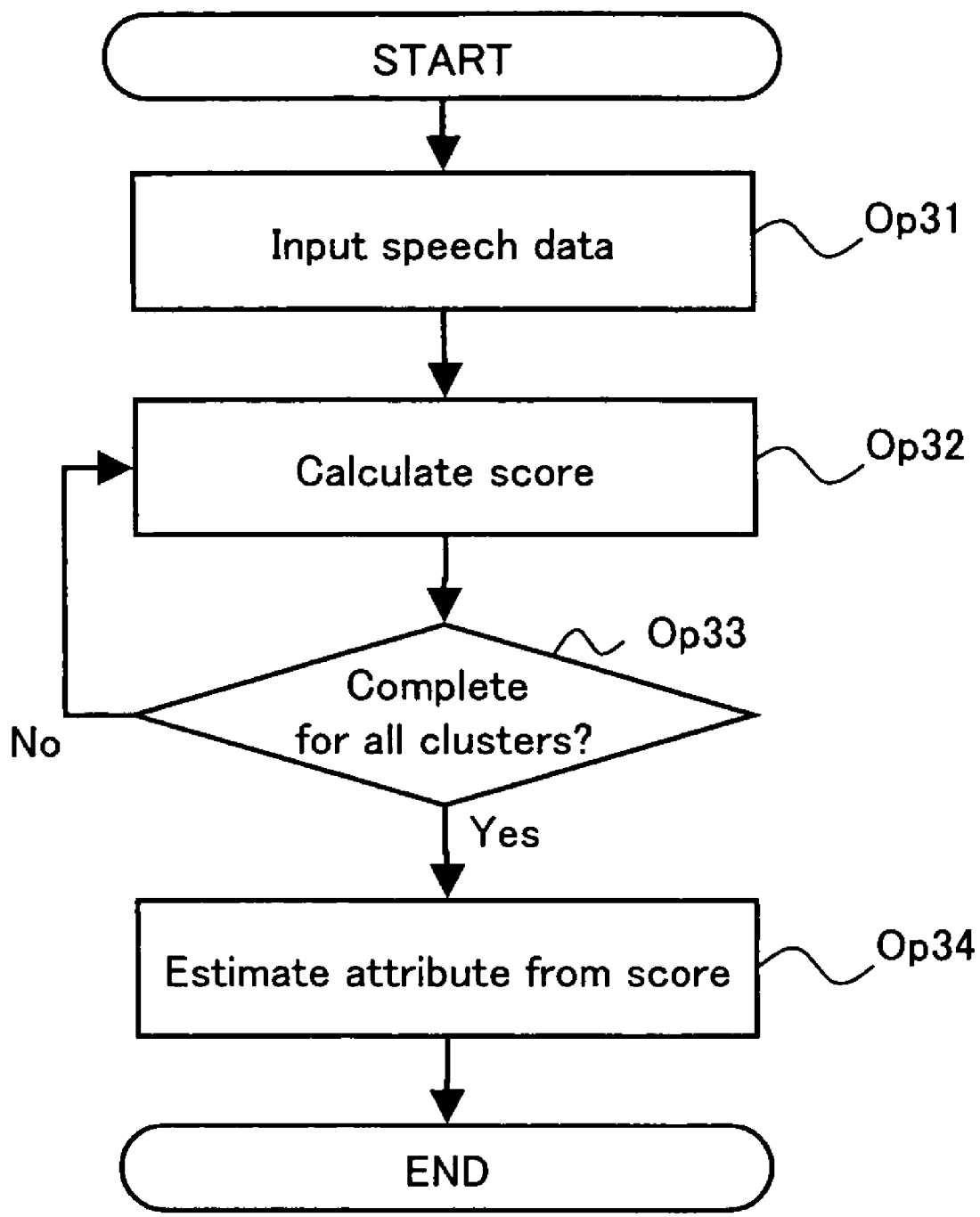
FIG. 17 is a flowchart showing an exemplary process of estimating an attribute of a speaker.

The following describes an operation example of the attribute estimation system 200. FIG. 17 is a flowchart showing an exemplary process of estimating the attribute of a speaker by the attribute estimation system 200. Firstly, speech data is input to the input unit 21b (Op31). The speech data is for example one sentence uttered by a speaker that has been made in the data form.

When the speech data is input, the score calculation unit 22b uses the input speech data and a clustered language model and a clustered audio model for one cluster to calculate a score of the cluster (Op32). The detailed process of the score calculation will be described later. The score is calculated for all of the clusters subjected to clustering by the clustering system 100 (Op33). Since a clustered language model and a clustered audio model are recorded for each cluster, a language score for each clustered language model and an audio score for the corresponding clustered audio model are calculated and integrated, whereby a score for each cluster can be calculated.

For instance, in the case where clustered audio models and clustered language models are recorded for three clusters of a cluster for speakers aged 5 to 8, a cluster for speakers aged 9 to 12 and a cluster for speakers aged 76 or older, the score calculation unit 22b calculates three scores, including a score for the cluster for speakers aged 5 to 8, a score for the cluster for speakers aged 9 to 12 and a score for the cluster for speakers aged 76 or older. This is an example where a clustered audio model and a clustered language model are recorded for a cluster corresponding to ages. However, the attribute corresponding to a cluster is not limited to ages. For instance, regions such as countries, prefectures and towns may be attributes corresponding to the clusters.

The attribute estimation unit 23b uses a score for each cluster to estimate the attribute of a speaker who uttered the input speech data (Op34). The attribute estimation unit 23b can output as the estimation result the attribute corresponding to the cluster with the best score among the scores for clusters calculated by the score calculation unit 22b. Alternatively, the attribute estimation unit 23b can output data in which a score for each cluster and the attribute are associated with each other.

For instance, among the cluster for speakers aged 5 to 8, the cluster for speakers aged 9 to 12 and the cluster for speakers aged 76 or older in the above-stated example, in the case where the score of the cluster for speakers aged 9 to 12 is the highest, the estimation result can be "ages 9 to 12".

(Example of Score Calculation)

Figure 18:
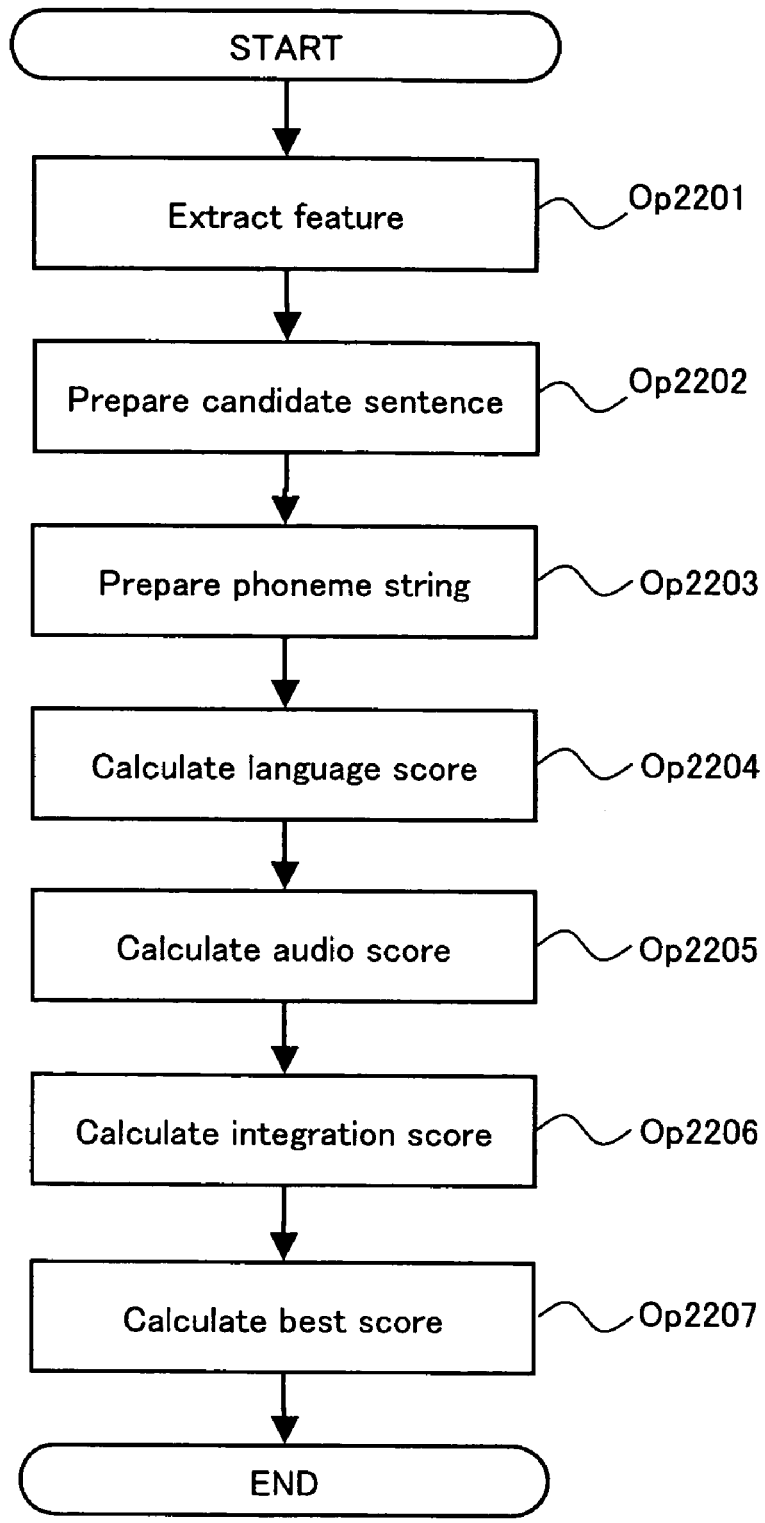
FIG. 18 is a flowchart showing a process of calculating a score for one cluster.

The following describes a specific example of the process of score calculation by the score calculation unit 22b. FIG. 18 is a flowchart showing the process by the score calculation unit 22b to calculate a score for one cluster.

Figure 19:
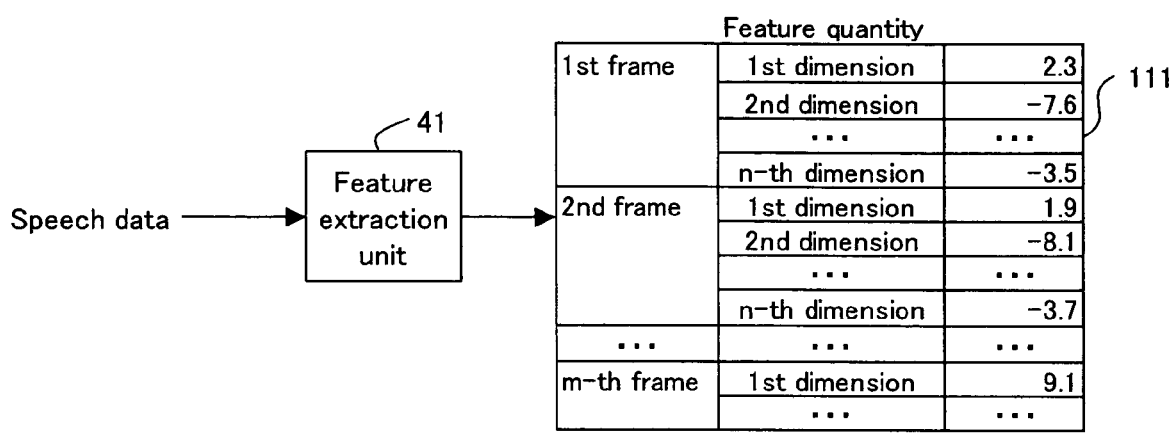
FIG. 19 shows an example of input/output data with respect to a feature extraction unit.

Firstly, the feature extraction unit 41 receives an input of speech data and generates data showing a feature quantity of voice represented by the speech data (Op2201). FIG. 19 shows an example of input/output data with respect to the feature extraction unit 41. The feature extraction unit 41 divides the input speech data into several frames along the time axis, and calculates a feature quantity for each frame. The calculated feature quantity is, for example, represented by data like feature quantity data 111. In the feature quantity data 111, a feature quantity of one frame is represented by a n-th-dimensional vector. The feature quantity data 111 has n pieces of values from the first dimension to the n-th dimension for each frame. An example of the feature quantity includes a spectrum, a cepstrum and the like.

Figure 20:
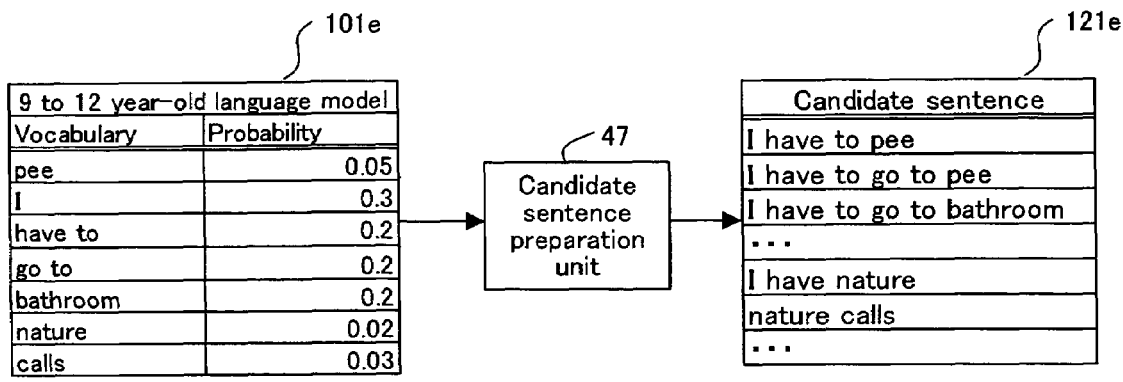
FIG. 20 shows an example of input/output data with respect to a candidate sentence preparation unit.

Next, the candidate sentence preparation unit 47 prepares a plurality of candidate sentences for one cluster using vocabularies included in the clustered language models (Op2202). FIG. 20 shows an example of input/output data with respect to the candidate sentence preparation unit 47. In the example of FIG. 20, the candidate sentence preparation unit 47 inputs a clustered language model 101e for a cluster of ages 9 to 12 (hereinafter called language model 101e), and outputs all sentences that are possible to be generated from the vocabularies included in the language model 101e as candidates. Candidate sentence data 121e shows candidate sentences generated based on the vocabularies of the language model 101e.

Figure 21:
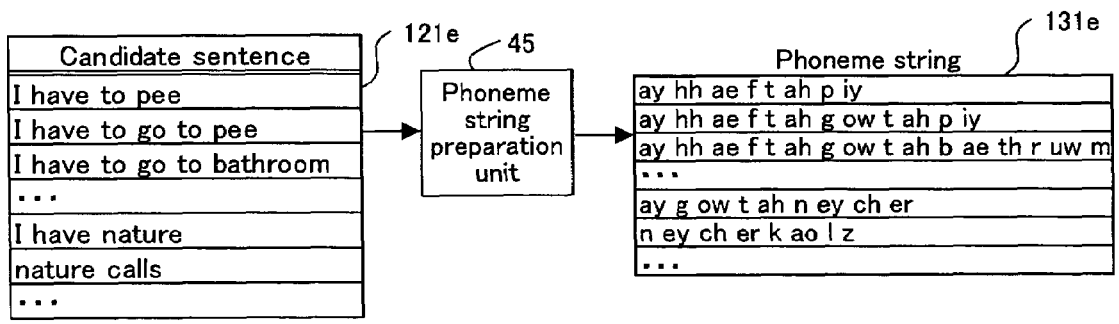
FIG. 21 shows an example of input/output data with respect to a phoneme string preparation unit.

When the candidate sentences are prepared, the phoneme string preparation unit 45 prepares a phoneme string corresponding to each of the plurality of candidate sentences prepared by the candidate sentence preparation unit 47 (Op2203). FIG. 21 shows an example of input/output data with respect to the phoneme string preparation unit 45. The phoneme string preparation unit 45 disassembles the plurality of candidate sentences represented by the candidate sentence data 121e into phonemes. A phoneme is the smallest unit of voice such as a consonant, a vowel and the like. In the audio score calculation process described later, this phoneme is used as the unit, and therefore the phoneme string preparation unit 45 is required. Phoneme string data 131e shows a phoneme string generated based on the candidate sentences of the candidate sentence data 121e.

Figure 22:
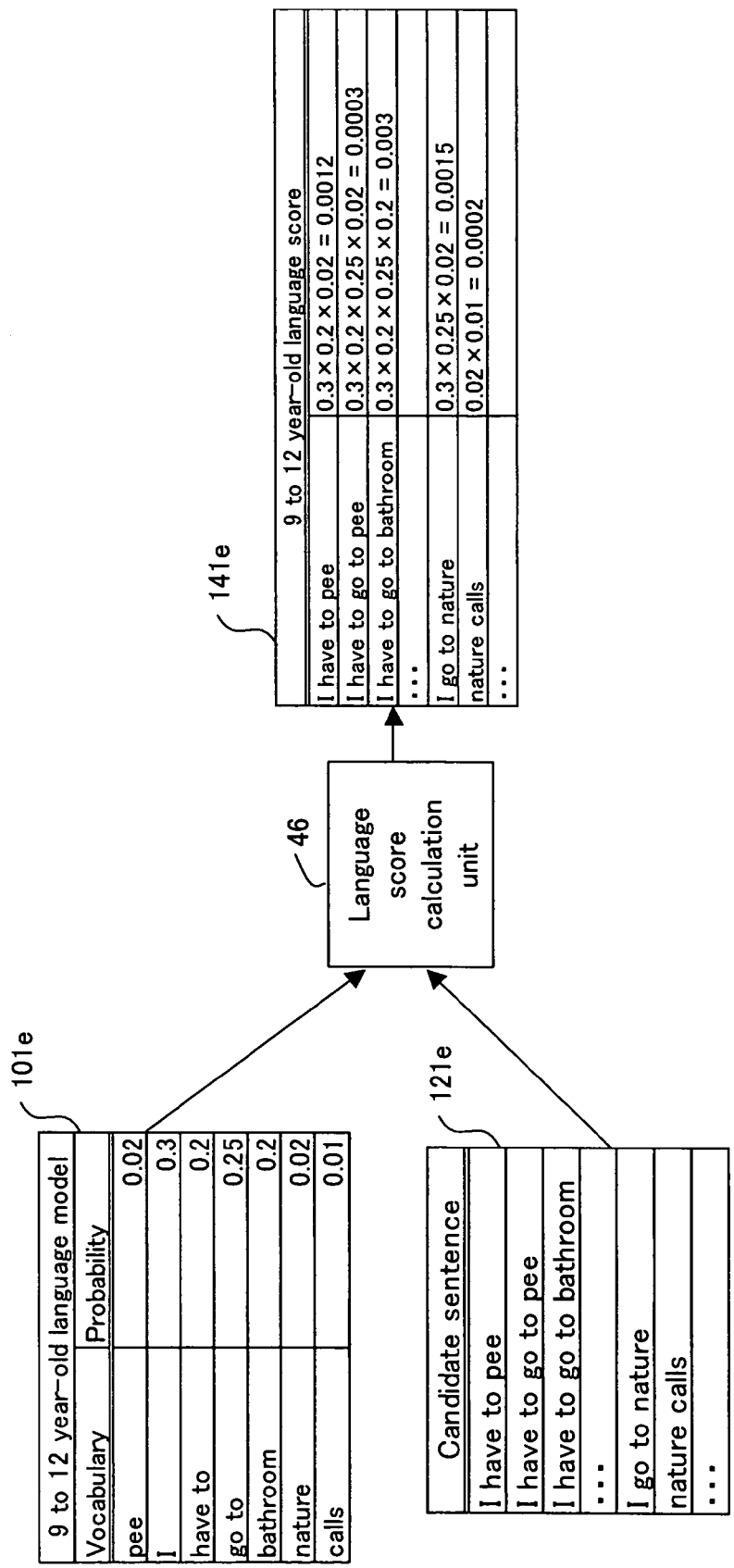
FIG. 22 shows an example of input/output data with respect to a language score calculation unit.

The language score calculation unit 46 calculates a language score for each of the plurality of candidate sentences prepared by the candidate sentence preparation unit 47, using the clustered language model that is a basis of the candidate sentences generated by the candidate sentence preparation unit 47 (Op2204). FIG. 22 shows an example of input/output data with respect to the language score calculation unit 46. In the example of FIG. 22, the language score calculation unit 46 calculates a language score for each candidate sentence using a probability of each vocabulary included in the language model 101e for ages 9 to 12. For instance, in the case where the candidate sentence is "I have to go to bathroom", the probability of the vocabulary "I" included in this sentence is "0.3", the probability of the vocabulary "have to" is "0.2", the probability of the vocabulary "go to" is "0.25" and probability of the vocabulary "bathroom" is "0.2". When they are multiplied, a score of "0.003" can be obtained. Language score data 141e of FIG. 22 includes language scores determined for the respective candidate sentences. Note here that although the language score data 141e of FIG. 22 includes formulas for determining scores for the sake of clarity, the actual data will not include formulas but simply include values of the language scores recorded.

The audio score calculation unit 42 calculates an audio score of the voice represented by the input speech data for each phoneme string of the candidate sentences prepared by the phoneme string preparation unit 45, using the data showing a feature quantity generated by the feature extraction unit 41 and the clustered audio model (Op2205). At this time, the clustered audio model used by the audio score calculation unit 42 is a clustered audio model belonging to the same cluster as that of the clustered language model that is the basis of the language score calculation.

Figure 23:
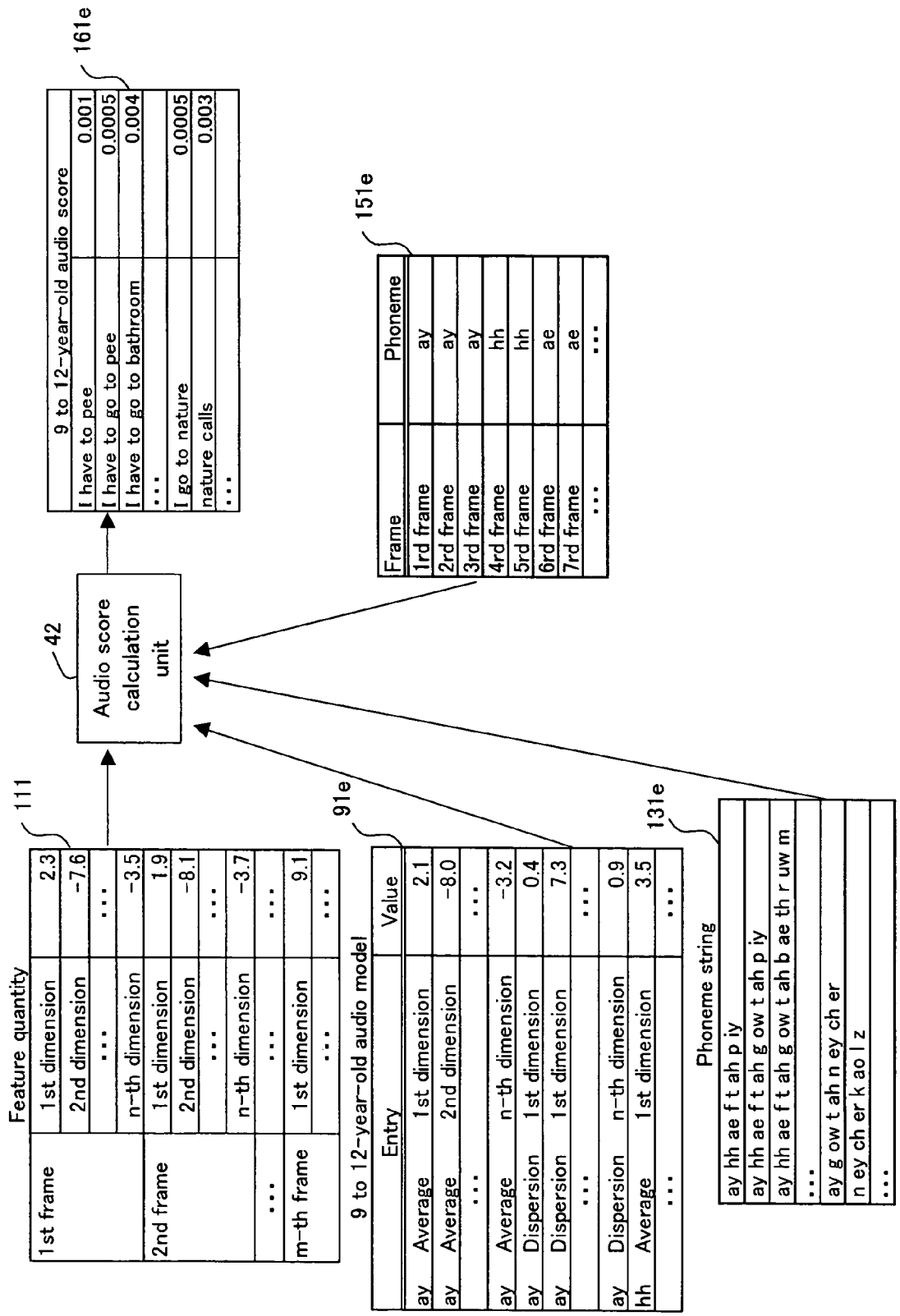
FIG. 23 shows an example of input/output data with respect to an audio score calculation unit.
Figure 26:
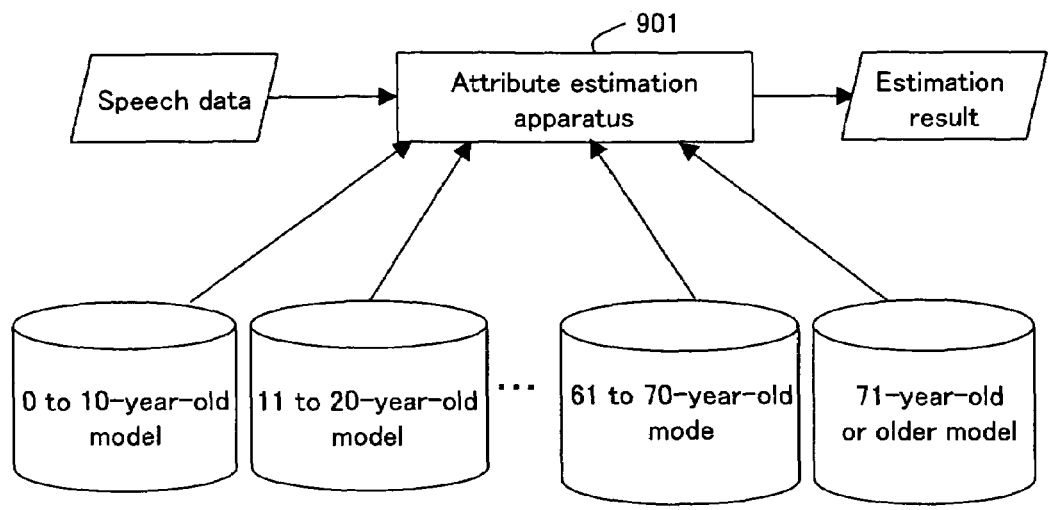
FIG. 26 shows the flow of data in a conventional attribute estimation apparatus.
Figure 27:
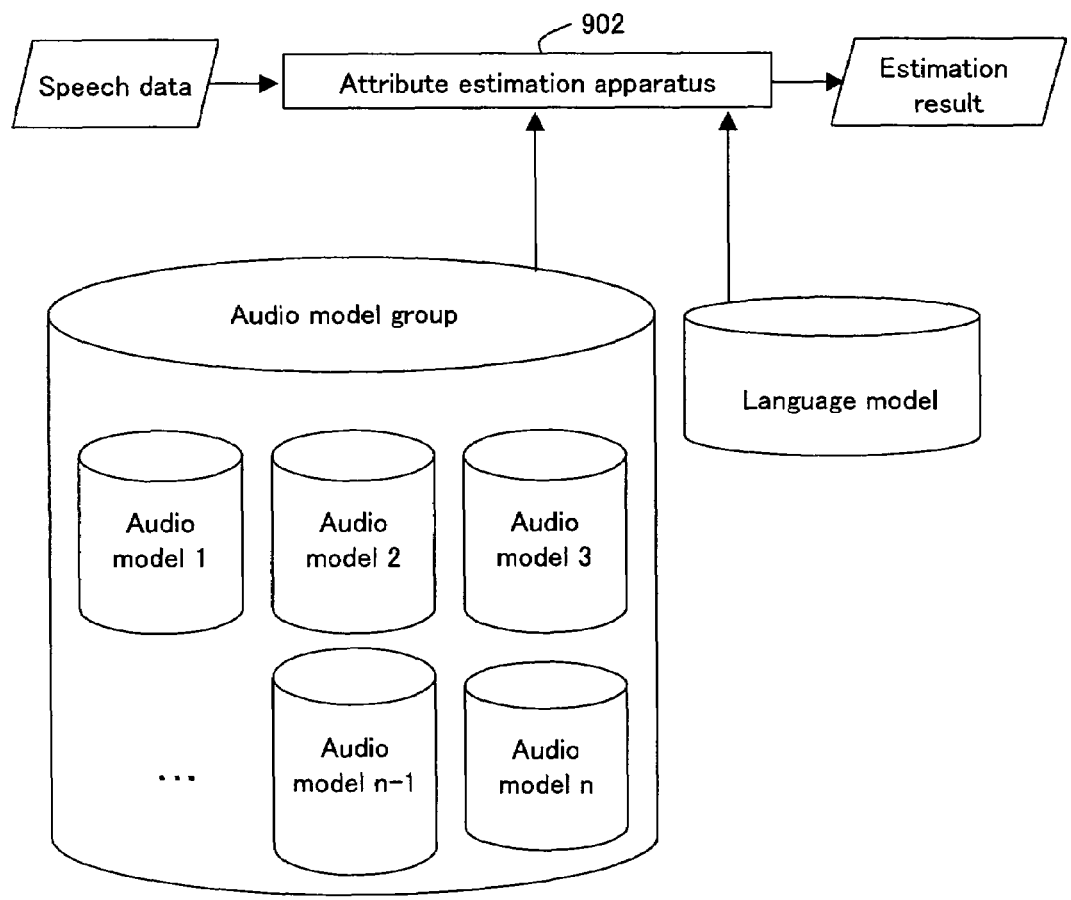
FIG. 27 shows the flow of data in a conventional attribute estimation apparatus that uses a language model and an audio model.

FIG. 23 shows an example of input/output data with respect to the audio score calculation unit 42. In the example of FIG. 23, the audio score calculation unit 42 calculates an audio score for each candidate sentence represented by the phoneme string data 131e using the feature quantity data 111 exemplified in FIG. 19 and a clustered audio model 91e for the cluster of ages 9 to 12 (hereinafter called audio model 91e). Note here that the phoneme string data 131e is the one generated by the phoneme string preparation unit 45 in the example of FIG. 21.

The audio score calculation unit 42 firstly refers to phoneme strings of each candidate sentence, and determines the correspondence between frames represented by the feature quantity data 111 and the phonemes. This is required because one phoneme does not always correspond to one frame. In the middle of FIG. 23, an example of correspondence data 151e is shown, which represents a correspondence relationship between frames and phonemes. This correspondence data 151e shows the correspondence relationship between the phoneme string "ayhhae . . . " and frames. The first frame to the third frame of the feature quantity data 111 correspond to the first "ay", and the fourth frame to the fifth frame correspond to the following "hh".

Next, the audio score calculation unit 42 determines an audio score for each frame from the first frame to the n-th frame included in the feature quantity data 111. The audio score for each frame is calculated for example by multi-dimensional normal distribution. In this example, for the sake of clarity, the case where the covariance matrix is composed of diagonal components only will be described. In this case, the probability density of the multi-dimensional normal distribution may be calculated by the following [formula 2], for example:

$$\frac{\exp(-\sum((Xi - \mu i)^2 / Vi))}{\sqrt{(\prod Vi)}} \quad \text{[formula 2]}$$

In the above-stated [formula 2], Xi denotes the i-th dimension of the feature quantity, and μi and Vi denote the i-th dimension of the average and the i-th dimension of the dispersion of the audio model, respectively. The following describes a specific example of calculating the audio score of the first frame. First, concerning the inside of exp (exponential function), since the first dimension of the first frame in the feature quantity data 111 is "2.3", X1 becomes 2.3. Referring to the correspondence data 151e showing the correspondence relationship between frames and phonemes, the first frame corresponds to the phonemes "ay", and therefore "ay" in the audio model 91e is referred to. The average and the dispersion of the first dimension of "ay" in the audio model 91e are "2.1" and "0.4", respectively, and therefore μ1 becomes 2.1 and Vi becomes 0.4. Therefore, the value inside Σ of exp (exponential function) of the first dimension (the case of i=1) becomes as follows:

$$-(2.3-2.1)^2/0.4$$

Concerning the second dimension (i=2), since the second dimension of the first frame in the feature quantity data is "−7.6", X2 becomes −7.6. The average and the dispersion of the second dimension of "ay" in the audio model 91e are "−8.0" and "7.3", respectively, and therefore μ2 becomes −8.0 and V2 becomes 7.3. Therefore, the calculation concerning the second dimension will be as follows:

$$-(7.6-(-8.0))^2/7.3$$

In this way, the audio score calculation unit 42 conducts the calculation up to the n-th dimension of the first frame, and thereafter the audio score calculation unit 42 adds these values and determines exp (exponential function) thereof. In the above [formula 2], the portion of $\sqrt{(\Pi Vi)}$ means to multiply the dispersions of "ay" from the first dimension to the n-th dimension and determine $\sqrt{}$ of it. As shown in [formula 2], the value subjected to exp is divided by $\sqrt{(\Pi Vi)}$, and the result thereof will be the audio score of the first frame.

The audio score of the second frame can be calculated similarly. Referring to the example of the correspondence relationship 151e between frames and phonemes, since the phonemes of the second frame also are "ay", the values of "ay" of the audio model 91e are used as the values of the average and dispersion therefor. Since the value of the feature quantity data 111 is different from that of the first frame, the value of the audio score of the second frame also becomes different from the value of the audio score of the first frame.

In this way, the audio score calculation unit 42 determines an audio score for each frame, and multiplies all of the audio scores of the respective frames, which is the audio score of the candidate sentence. Similarly, the audio score calculation unit 42 calculates audio scores for all candidate sentences. Audio score data 161e for ages 9 to 12 of FIG. 23 is exemplary data containing the audio scores determined for the respective candidate sentences.

The above example describes the case where the correspondence relationship between frames and phonemes is firstly determined, and then an audio score for each frame is determined. However, in the actual applications, an algorithm for dynamically determining the correspondence relationship is required in many cases in order to get the optimum audio score of the sentence as a whole. This algorithm is called Viterbi algorithm (see "Speech recognition by probability model" written by Seiichi NAKAGAWA, published by The Institute of Electronics, Information and Communication Engineers, Japan, Jul. 1, 1988, pp 44 to 46). This document describes the Viterbi algorithm in detail. That is an example of the audio score calculation (Op2205 of FIG. 18).

When the audio score is calculated, the integrated score calculation unit 43 calculates an integration score for each candidate sentence, where the integrated score includes the integration of the audio score calculated by the audio score calculation unit 42 and the language score calculated by the language score calculation unit 46 (Op2206). FIG. 24 shows an example of input/output data with respect to the integrated score calculation unit 43. In the example of FIG. 24, the integrated score calculation unit 43 calculates an integration score of each candidate sentence based on the audio score data 161e for ages 9 to 12 and the language score data 141e for ages 9 to 12, and outputs the result as integration score data 171e for ages 9 to 12. The integration score for each candidate sentence is the value obtained by multiplication of the audio score and the language score of each candidate sentence. For instance, considering the candidate sentence of "I have to pee", the audio score shown with the audio score 161e is "0.001" and the language score shown with the language score 141e is "0.0012". The integrated score calculation unit 43 calculates the multiplied values of these audio score and language score, i.e., 0.001×0.0012=0.0000012, as the integration score. An example of the integration scores calculated for other candidate sentences are shown in the integration score data 171e. Note here that although the integration score data 171e of FIG. 24 includes formulas for determining the integration scores for the sake of clarity, the actual data will not include formulas but simply include values of the integration scores recorded.

When the integration score is calculated, the best score calculation unit 44 outputs the best score among the integration scores calculated for the respective candidate sentences as the score of the attribute corresponding to the cluster (Op2207). FIG. 25 shows an example of input/output data with respect to the best score calculation unit 44. In the example of FIG. 25, the best score calculation unit 44 outputs as the score of "ages 9 to 12" the best score of "0.000012" among the integration score data 171e for ages 9 to 12.

The process of FIG. 18 is completed in this way. Thereby, a score for one cluster can be calculated. The process of FIG. 18 is performed for each cluster subjected to classification by clustering by the clustering system 100, so that a score for each cluster can be calculated.

Note here that the process of calculating a score is not limited to the above example of FIG. 18. Further, the execution order of the respective processes of Op2201 to Op2207 of FIG. 18 is not limited to the order of FIG. 18. For instance, in the mode of FIG. 18, the language score calculation (Op2204) and the audio score calculation (Op2205) are executed in series. However, the language score calculation (Op2204) and the audio score calculation (Op2205) may be executed in parallel. Moreover, the feature extraction process (Op2201) may be executed in parallel with the candidate sentence preparation (Op2202) and the phoneme string preparation (Op2203) as long as the feature extraction process (Op2201) is executed prior to the audio score calculation (Op2205).

The present invention is effective to a clustering system capable of clustering language models and an attribute estimation system using the clustering system so as to estimate attributes such as ages and hometowns of speakers based on language uttered by the speakers.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A clustering system that clusters a language model group including language models that correspond to a plurality of attribute values, each language model being associated with an attribute value showing a predetermined attribute of humans and having a plurality of entries including vocabularies appearing as speech uttered by or text written by one or more humans having attributes represented with the attribute values and data representing occurrence frequencies of the vocabularies, the clustering system comprising:

a union language model preparation unit that generates union data representing a union of vocabularies included in the language model group and prepares a union language model including the union of the vocabularies and occurrence frequencies of the vocabularies using the union data, the union language model being prepared for each language model included in the language model group, so as to prepare a union language model group; and a clustering unit that performs clustering, which classifies the union language model group into a plurality of clusters in which a difference in similarities between union language models belonging to one cluster is minimized, and generates cluster data representing one or more of the union language models included in each cluster, wherein when the union language model preparation unit prepares a union language model for a certain language model, the union language model preparation unit records vocabularies included in the certain language model among the vocabularies included in the union data associated with occurrence frequencies of the vocabularies in the certain language model as entries in the union language model, and records vocabularies not included in the certain language model among the vocabularies included in the union data associated with data showing that an occurrence frequency is 0 as entries in the union language model.

2. The clustering system according to claim 1, wherein the clustering unit further generates a clustered language model corresponding to each cluster represented with the cluster data, based on a union language model included in the each cluster.

3. The clustering system according to claim 2, further comprising an entry deletion unit that, among entries included in the union language models or the clustered language models, deletes entries having occurrence frequencies less than a predetermined threshold value.

4. The clustering system according to claim 2, further comprising an entry deletion unit that, among entries included in the union language models or the clustered language models, keeps N pieces of higher-rank entries in decreasing order of occurrence frequencies and deletes remaining entries.

5. The clustering system according to claim 1, further comprising a linking recording unit that records audio models associated with the union language models having the corresponding attribute values as linking models for the respective attribute values, the audio models corresponding to a plurality of attribute values, each audio model being associated with an attribute value showing a predetermined attribute of humans and having a plurality of entries including audios included in speech of humans having attributes represented with the attribute values and data representing occurrence frequencies of the audios, wherein the clustering unit performs clustering with respect to the linking models having respective attribute values recorded by the linking recording unit so as to classify the linking models into a plurality of clusters, and generates cluster data representing each cluster.

6. The clustering system according to claim 5, further comprising a weighting unit that multiplies at least one of data representing occurrence frequencies included in the entries of the audio models and data representing occurrence frequencies included in the entries of the union language models by a weighting factor so as to adjust at least one of a dispersion of the occurrence frequencies in the audio models and a dispersion of the occurrence frequencies in the union language models.

7. An attribute estimation system that estimates an attributes of a human using cluster data and union language models generated and prepared by the clustering system according to claim 1, the attribute estimation system comprising:

an input unit by which language information on the human is input;

a score calculation unit that calculates a score of the language information input by the input unit using the union language models, the score being calculated for each cluster represented by the cluster data; and an attribute estimation unit that generates data showing an attribute of the human based on the scores for the respective clusters, so as to estimate the attribute.

8. An attribute estimation system that estimates an attribute of a human using cluster data and union language models generated and prepared by the clustering system according to claim 5, the attribute estimation system comprising:

an input unit by which data representing speech of the human is input;

a language score calculation unit that calculates a language score of the speech input by the input unit using the union language models, the language score being calculated for each cluster represented by the cluster data;

an audio score calculation unit that calculates an audio score of the speech input by the input unit, the audio score being calculated for each cluster represented by the cluster data; and an attribute estimation unit that generates data showing an attribute of the human based on the audio scores for the respective clusters and the language scores for the respective clusters, so as to estimate the attribute.

9. A clustering method for clustering a language model group using a computer, the language model group including language models that correspond to a plurality of attribute values, each language model being associated with an attribute value showing a predetermined attribute of humans and having a plurality of entries including vocabularies appearing as speech uttered by or text written by one or more humans having attributes represented with the attribute values and data representing occurrence frequencies of the vocabularies, the method comprising the steps of:

a union preparation step in which a union language model preparation unit provided in the computer generates union data representing a union of vocabularies included in the language model group and prepares a union language model including the union of the vocabularies and occurrence frequencies of the vocabularies using the union data, the union language model being prepared for each language model included in the language model group, so as to prepare a union language model group; and a cluster data generation step in which a clustering unit provided in the computer performs clustering, which classifies the union language model group into a plurality of clusters in which a difference in similarities between union language models belonging to one cluster is minimized, and generates cluster data representing one or more of the union language models included in each cluster, wherein in the union preparation step, when the union language model preparation unit prepares a union language model for a certain language model, the union language model preparation unit records vocabularies included in the certain language model among the vocabularies included in the union data associated with occurrence frequencies of the vocabularies in the certain language model as entries in the union language model, and records vocabularies not included in the certain language model among the vocabularies included in the union data associated with data showing that an occurrence frequency is 0 as entries in the union language model.

10. A recording medium storing a clustering program that makes a computer execute a clustering process of a language model group including language models that correspond to a plurality of attribute values, each language model being associated with an attribute value showing a predetermined attribute of humans and having a plurality of entries including vocabularies appearing as speech uttered by or text written by one or more humans having attributes represented with the attribute values and data representing occurrence frequencies of the vocabularies, the program making the computer execute the following processes of:

a union language model preparation process of generating union data representing a union of vocabularies included in the language model group and preparing a union language model including the union of the vocabularies and occurrence frequencies of the vocabularies using the union data, the union language model being prepared for each language model included in the language model group, so as to prepare a union language model group; and a clustering process of performing clustering, which classifies the union language model group into a plurality of clusters in which a difference in similarities between union language models belonging to one cluster is minimized, and generating cluster data representing one or more of the union language models included in each cluster, wherein in the union language model preparation process, when a union language model is prepared for a certain language model, the program makes the computer execute the process of recording vocabularies included in the certain language model among the vocabularies included in the union data associated with occurrence frequencies of the vocabularies in the certain language model as entries in the union language model, and recording vocabularies not included in the certain language model among the vocabularies included in the union data associated with data showing that an occurrence frequency is 0 as entries in the union language model.

* * * * *